US009898777B2

United States Patent
Chen et al.

(10) Patent No.: US 9,898,777 B2
(45) Date of Patent: Feb. 20, 2018

(54) APPARATUS, METHOD AND SYSTEM FOR PROVIDING MACHINE-TO-MACHINE APPLICATIONS DEVELOPMENT

(71) Applicant: Verizon Patent and Licensing Inc., Arlington, VA (US)

(72) Inventors: Zhong Chen, Acton, MA (US);
Theodore G. Poppe, Quincy, MA (US);
Bryce Schadl, Ashland, MA (US);
Steve Pietraszek, Clark, NJ (US);
Aiqun Angie Guo, Weston, MA (US);
Victor D. Chan, Newton, MA (US);
Bilal Wahid, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 724 days.

(21) Appl. No.: 14/463,248

(22) Filed: Aug. 19, 2014

(65) Prior Publication Data
US 2016/0055573 A1 Feb. 25, 2016

(51) Int. Cl.
*G06Q 30/00* (2012.01)
*G06Q 30/06* (2012.01)
*G06F 9/445* (2018.01)

(52) U.S. Cl.
CPC .......... *G06Q 30/0641* (2013.01); *G06F 8/60* (2013.01); *G06Q 30/0613* (2013.01)

(58) Field of Classification Search
CPC ............. G06C 30/0601–30/0645; G06C 30/08

USPC ................................................ 705/26.1–27.2
See application file for complete search history.

(56) References Cited

U.S. PATENT DOCUMENTS

| 8,938,497 | B1* | 1/2015 | Wang | H04N 21/43615 709/204 |
| 2012/0311157 | A1* | 12/2012 | Erickson | G06F 9/541 709/226 |
| 2014/0358734 | A1* | 12/2014 | Sehgal | G06Q 30/0641 705/27.1 |
| 2015/0135163 | A1* | 5/2015 | Mun | G06F 8/71 717/120 |

OTHER PUBLICATIONS

Antonio J. Jara et al., "Mobile Digcovery: Discovering and Interacting with the World Through the Internet of Things," Springer-Verkag London, Mar. 10, 2013 (accessed Sep. 11, 2017).*

* cited by examiner

*Primary Examiner* — Matthew Zimmerman
*Assistant Examiner* — Katherine O'Sullivan

(57) ABSTRACT

A framework for a machine-to-machine (M2M) application development is disclosed. The framework enables users to login and affect devices and applications that may interact with the devices by enabling M2M applications. The framework enables M2M application creation, management, and development of various profiled devices based on predefined data models associated with corresponding devices. Furthermore, the framework enables marketplace options to permit users to specify purchase options as well as to buy devices and applications.

24 Claims, 31 Drawing Sheets

FIG. 7N

M2M OEM PORTAL

WELCOME, JOHN | MY PROFILE | LOG OUT

SEARCH

HOME  BUILD  DEPLOY  MANAGE  DEVICES  MARKETPLACE — 708

DEVICES
SPACE
SETTINGS
DETAILED REPORTING
APPLICATIONS

HEALTH OVERVIEW (ALL SPACES/APPS)
APP. ERRORS ④   APP. ERRORS ①
CPU USAGE  BANDWIDTH  CPU USAGE
— 710

OPTIONS
☑ VZ M2M AEP SERVICES (INCLUDED)
☑ LOCATION SERVICES ($)
☐ REMOTE FIRMWARE UPDATES ($)
☑ SENSOR STORAGE ($)
☑ CRM INTEGRATION ($)
— 712

— 714
④ APP. ERRORS
① DEVICE ERRORS

| APPLICATION NAME | # DEVICES ACTIVATED | MAX SIMUL CONNECTED DEVICES | # OF TRANSACTIONS | BANDWIDTH USAGE | BANDWIDTH TIER |
|---|---|---|---|---|---|
| ⚠ ☐ △ APPLICATION 1 | 0 | 0 | 0 | 0 MB | 50 MB/MONTH |
| ⚠ ☐ △ APPLICATION 2 | 5 | 2 | 30 | 40 MB | 50 MB/MONTH |
| ⚠ ☐ △ PDI BRAND CONTROLLER | 24 | 19 | 280 | 180 MB | 200 MB/MONTH |

1200

APPARATUS, METHOD AND SYSTEM FOR PROVIDING MACHINE-TO-MACHINE APPLICATIONS DEVELOPMENT

BACKGROUND INFORMATION

Machine-to-machine (M2M) applications are generally developed for various devices with sensors available in a network. M2M applications require access to individual devices and sensors for development of the M2M application. Sensors available in the network may be provided by different Original Equipment Manufacturers (OEMs), and hence may follow different standards or protocols for communication and coding. These sensors typically operate independently with little or no coordination among them. Further, the data captured by these sensors may not be in a standard format and data may be difficult to be analyzed. Therefore, the M2M application developers and OEMs face challenges in developing a new M2M application and OEM devices by using conventional application development platforms.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for developing an Application Enablement Platform (AEP) for machine-to-machine (M2M) communication, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention. Although the various exemplary embodiments are described with respect to a sensor platform, it is contemplated that these embodiments have applicability to other architectures.

Although the various exemplary embodiments are described with respect to cloud computing and services, it is contemplated these embodiments have applicability to other computing technologies and architectures.

Figure 1:
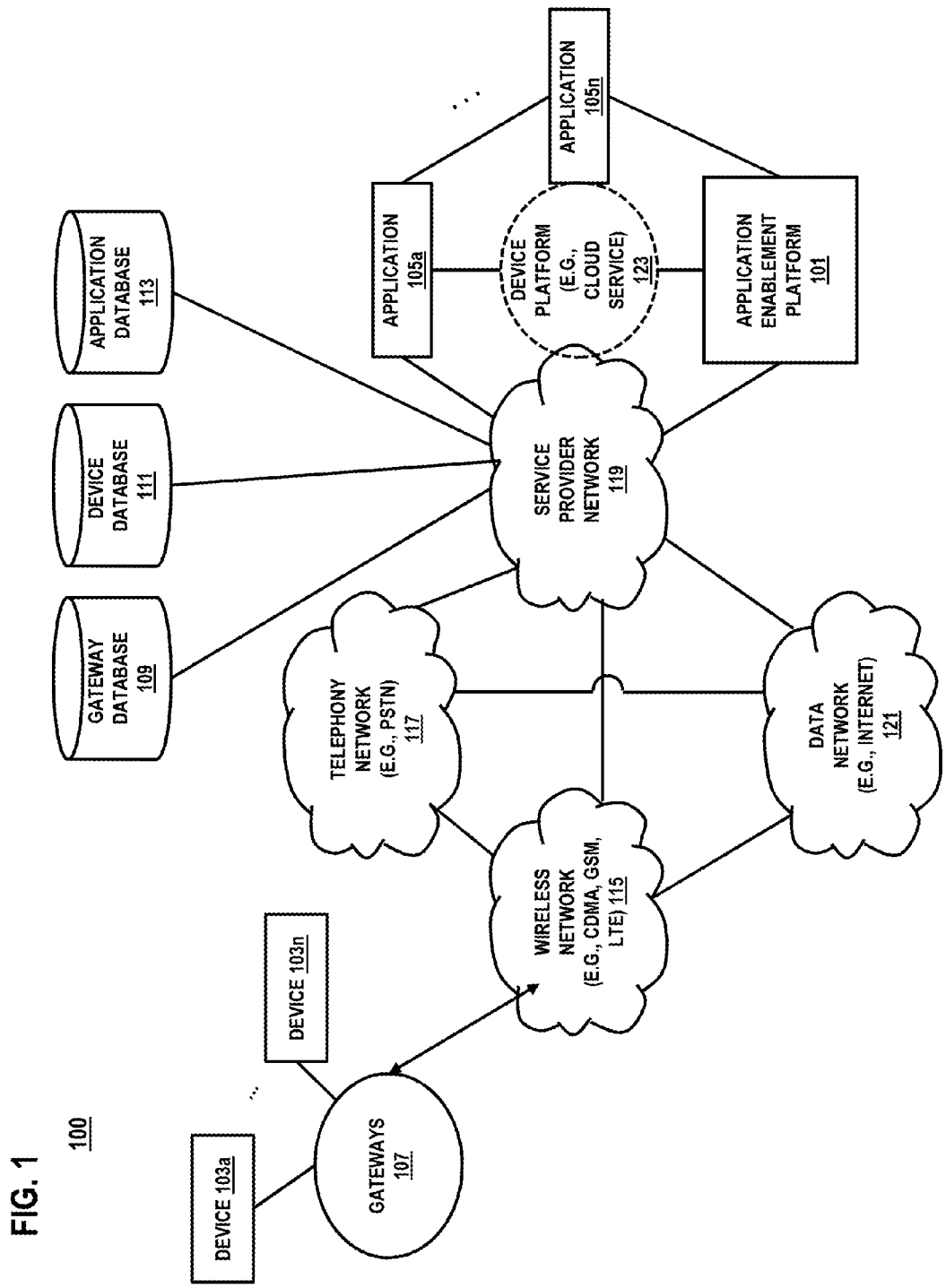
FIG. 1 is a diagram of a system for providing machine-to-machine (M2M) application development, according to one embodiment.

FIG. 1 is a diagram of a system for providing machine-to-machine (M2M) application development, according to one embodiment. System 100 is capable of collecting data from various devices or sensors for enabling an Application Enablement Platform to develop a framework for multiple M2M applications, according to one embodiment. For the purpose of illustration, the system 100 employs, in certain embodiments, an Application Enablement Platform (AEP) 101 for developing a common platform for an application developer user and a device developer user to develop M2M application. The AEP 101 provides the device developer user and the application developer user with multiple end-to-end solutions. The objectives of the AEP 101 is to provide end-to-end solutions for development of the M2M application by defining AEP 101 payload specification which specifies payload data format or message format of a device, and to make it available for all OEMs such as for sensor OEMs or gateway OEMs. Further, the AEP payload specification, in one embodiment, may be used in AEP adapters when it is not feasible or otherwise not desirable to make AEP specifications compliant inside a device. In some embodiments, the AEP adapters may be used in gateway devices or AEP Cloud services.

In one embodiment, the AEP 101 may provide a framework for a lifecycle of M2M application development and may further serve as a proxy platform to achieve Sensor to Cloud (S2C) and/or Sensor to Application (S2A) implementations. For this purpose, the AEP 101 may include components such as AEP Open Payload Specification module to provide standard specifications for a payload data format, a message format, and the like. These specifications may be used for M2M communication in Personal Area Network (PAN) protocols.

The system 100 may further include AEP agents/adapters to interact with multiple machines or devices 103a-103n (herein after referred to as devices 103), external applications 105a-105n, gateways 107, and/or cloud applications. In one embodiment, the devices 103 may include sensors, devices or machines with sensors, and the like. The AEP 101 agents/adapters may interact with external applications/services over the Internet. A developer portal or a developer interface of the AEP 101 may be used to access AEP reference material, sample applications and tools required to develop the platform for machine-to-machine communication. The developer portal may use a drag and drop Graphical User Interface (GUI) in conjunction with AEP application templates for various purposes such as to download AEP specifications, to build application and test sandbox, and the like. Further, the developer portal may be used by different types of users, for example, OEM or device developer users, application developer users, and application or end users. The AEP 101 may further include a cloud environment to provide cloud based resources for different phases of the AEP 101 such as development, testing, staging, and/or production environments. The AEP 101 may include a marketplace module which may be considered as a public repository for the M2M applications from different AEP partners or providers.

In some embodiments, the AEP 101 develops M2M applications 105a-105n that may be used to control the devices 103a-103n directly, or via a gateway 107 locally and/or from a remote location. The gateway 107 supports independent device development and application development. In some embodiment, the gateway 107 may include sensor agents/adapters for handling communications and necessary mediation with the devices 103, gateway registration for on boarding of the gateway devices, gateway health/status requests for collecting information on the gateway health from multiple sources, gateway configuration to provide tooling to assist in configuring gateway setup in areas such as firmware update, security, user access, application privileges, backup and restore, etc. The gateway 107 may further include sample gateway applications to enable device and application developer users to use and configure local communication, data management, and a cloud agent/adapter for handling communication with upstream cloud applications. The cloud agent/adapter may also provide intelligence capturing payload information to make existing device payload AEP compliant, and to persist data in for modeling purposes.

In order to develop a common AEP platform, the AEP 101 may access data from various repositories, in some embodiments. The AEP 101 may access these repositories via a web browser and/or an AEP mobile application (or App) installed in mobile devices of the device and/or application developer users. The AEP 101 may access gateway data from a gateway database 109, in one embodiment. The gateway data may include data such as gateway configurations, gateway application templates, gateway documentation, and the like. The AEP 101 may further access device data from a device database 111 in one implementation. The device data may include sensor models, sample sensor configurations, sensor documentation, sensor simulators, and the like. In an embodiment, the gateway data is stored in a single repository and the device data is stored in another repository in order to help the developer users to view device models and configurations from a single database and to easily develop the application. In another embodiment, the gateway data and the device data may be replicated over multiple repositories.

In one embodiment, the AEP 101 may further access an application database 113 to access application data. The application data may include data such as application metadata, device repository/catalog, virtual or reference gateway, type of application, reference templates, and the like. In one embodiment, the application database 113 may include drag and drop application templates that are created based on the sensor models (e.g., capability and attribute templates that are device hardware OEM agnostics) which may be used to bind existing templates with new hardware devices by the device developer users and the application users.

The AEP 101 may further collect data from the databases or repositories 109-113 and from the devices 103a-103n through various networks 115-121. For illustrative purposes, the networks 115-121 may be any suitable wired and/or wireless network, and be managed by one or more service providers 119. For example, wireless network 115 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like. Telephony network 117 may include a circuit-switched network, such as the Public Switched Telephone Network (PSTN), an Integrated Services Digital Network (ISDN), a Private Branch Exchange (PBX), or other like network. Meanwhile, data network 121 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network.

Although depicted as separate entities, networks 115-121 may be completely or partially contained within one another, or may embody one or more of the aforementioned infrastructures. For instance, the service provider network 119 may embody circuit-switched and/or packet-switched networks that include facilities to provide for transport of circuit-switched and/or packet-based communications. It is further contemplated that networks 115-121 may include components and facilities to provide signaling and/or bearer communications between the various components or facilities of the system 100. In this manner, the networks 115-121 may embody or include portions of a signaling system 7 (SS7) network, or other suitable infrastructure to support control and signaling functions. In addition the system 100 may operate as separate parts that rendezvous and synchronize periodically to form a larger system with similar characteristics.

According to exemplary embodiments, end user devices (not shown) may be utilized to communicate over the system 100 and may include any Customer Premise Equipment (CPE) capable of sending and/or receiving information over one or more of networks 115-121. For instance, voice terminal may be any suitable Plain Old Telephone Service (POTS) device, facsimile machine, set top box, etc., whereas mobile device (or terminal) may be any cellular phone, radiophone, satellite phone, smart phone, wireless phone, vehicle telematics device, or any other suitable mobile device, such as a Personal Digital Assistant (PDA), pocket personal computer, tablet, customized hardware, etc. Further, computing device may be any suitable computing device, such as a VoIP phone, a Skinny Client Control Protocol (SCCP) phone, a Session Initiation Protocol (SIP) phone, an IP phone, a personal computer, a soft phone, a workstation, a terminal, a server and the like.

The system 100 may further include a device platform 123 to provide cloud services, to enable the AEP 101 to communicate with the devices 103 and the applications 105 through one or more gateways 107 and through telephony network 117, service provider network 119, wireless network 115, and data network 121, in one embodiment. The device platform 123 provides cloud based services to the AEP 101. The device platform 123 may include a server environment to provide templates for building configurations. The device developer user or a system administrator may provide necessary information to enable the provisioning of the server. In one implementation, the AEP template may incorporate parameters such as number of Central Processing Units (CPUs), disk space, memory, bandwidth, IP address allocations, billing/chargeback mechanisms, and the like. The device platform 123 may also include load applications which enable the device and/or application developer user to provide mechanisms to load applications into one or more server environments. The device platform 123 may further include security standards for the AEP 101 designed for secure default operation of the AEP end-to-end solutions. The device platform 123 may further include a logging module to provide default login to the system level events such as an event logging, user session (e.g., mobile app or browser app) start and stop, application level messages (e.g., warnings, errors, etc.), and the like. It is contemplated that device platform 123 may include telephony network 117, service provider network 119, wireless network 115, and data network 121, and other service provider networks. The AEP 101 exposes the device 103 interactions with the applications 105 via Application Programming Interface (API), Software Development Kit (SDK), and Platform as a Service (PaaS) to manage the devices 103 and their data in the cloud. The device platform 123 may further provide various services such as application integration tools to provide adaptors/templates for third party application integration. In one implementation, this integration with the third party applications may be beneficial for the application user logic configuration templates. Further, the device platform 123 may provide core utility services for cloud or gateway applications such as notification/messaging services (e.g., SMS, emails, text to voice etc.), push alerts/updates to dashboards or mobile devices, and the like. The device platform 123 may also provide testing services to display the devices/gateway information, their configuration etc. In one scenario, if a physical device is not present for testing, then a virtual device such as an emulator device based on the sensor model, may be provided to facilitate testing, debugging or development of the application.

Figure 2:
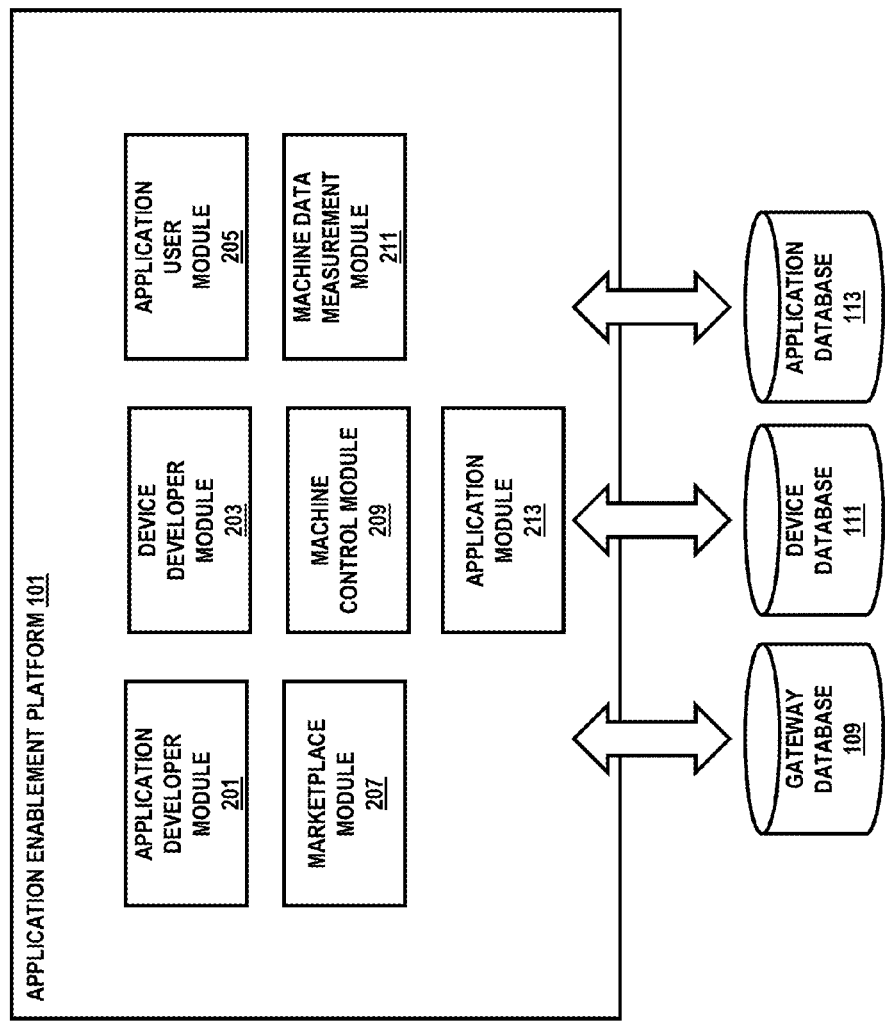
FIG. 2 is a diagram of an Application Enablement Platform (AEP) for M2M application development, according to one embodiment.

FIG. 2 is a diagram of the AEP 101 for M2M application development, according to one embodiment. The AEP 101 interacts with the databases 109-113 for developing the M2M applications, according to one embodiment. The AEP 101 may include an application developer module 201, a device developer module 203, an application user module 205, a marketplace module 207, a machine control module 209, a machine data measurement module 211, and an application module 213.

The application developer module 201 may create applications for M2M communication, in one embodiment. The applications may be in the form of a mobile application, an application that run in cloud environment, gateways, or device control panels, and/or interact with third party systems/services. The application developer module 201 may create the M2M application framework based on a communication path and/or a communication technology type associated with the devices. In another embodiment, the application developer module 201 may present one or more user interface options to the application developer user based on the primary functionality of the one or more devices and/or one or more device data measurements for developing the M2M application. In one scenario, one screen of an interface may display a list of one or more devices 103, and/or gateways 107 associated with an application user, a second screen of the interface may display options to register a new device and/or gateway associated with the application user and a third screen of the interface may display a marketplace option to enable the application user to purchase one or more devices, gateways and/or M2M applications.

Further, the application developer module 201 may create the M2M application by using a drag and drop GUI approach which is capable of working with the AEP pre-defined application templates stored in the application database 113. In this approach, the application developer user may use existing templates in order to create a new M2M application to avoid programming required for building the application. In other approach, the application developer user may develop the M2M application in a local environment by downloading AEP sandbox. In one embodiment, the application developer module 201 may configure existing marketplace applications for further usage. In another embodiment, the application developer module 201 may create new applications by extending existing models of the devices 103. In order to create these applications, the application developer module 201 may require sensor models having a set base reference of sensor attributes and their operations. The attributes of the sensor models may include various parameters the sensor is capable of measuring, like temperature, light, acceleration, vehicle performance parameters, machinery performance parameters, etc. The application developer module 201 may further add additional attributes, operations or commands to the M2M application associated with the sensing device 103. In yet another embodiment, the application developer module 201 may change run time parameters, configuration, or rule sets of the M2M application.

The application developer module 201 may download software development kits (SDKs) required to develop the M2M application for the M2M communication. In one embodiment, the application developer module 201 may download cloud based SDKs provided by the device developer users. The cloud based SDKs may include payload specifications, libraries, documentation, sample code, and the like.

The application developer module 201 may enable the application developer user to download abstract sensor models of the devices 103 from marketplace repositories or any other type of abstract model of device 103, in one embodiment. The abstract model may include models of codes, documents, models associated with the devices, gateways, applications, and the like. In one scenario, the marketplace repositories may be used to search, download, and purchase AEP components (e.g., sensors, gateways, application models, codes, documents, etc.).

Further, the application developer module 201 may provide documentation or reference guides for the application users. The documentation or the reference guides may be viewed online or may be downloaded for various functionalities. In one embodiment, the documentation may be viewed or downloaded for providing AEP open payload model specifications, AEP API reference specifications, sample application codes/models, and the like. In other embodiment, the application developer module 201 provides secure access to the application developer user or an application user. Further, the application developer module 201 may provide user feeds from other applications associated with the devices 103 of another brand.

In one implementation, the application developer module 201 builds application and testing sandbox for testing the devices 103. The testing of the devices 103 may enable the application developer user to run a simulation of sensor inputs, actuator output, applications, and the like to debug the M2M application using a device emulator. Further, the application developer module 201 may enable the application developer user to visualize the sensor data from the gateways, and/or from the applications displayed on the application. The application developer module 201 may further enable the application developer to test the AEP services. Moreover, the application developer module 201 may provide privacy to the developer and user settings, in one embodiment.

The device developer module 203 enables the device developer user to build the M2M application having device configurations and identification data in their favorite Integrated Development Environment (IDE). The device identification data may include a device name, a device type, a device category/description, brand, a model number, a version number, a communication type, communication protocols, and the like. In one embodiment, the communication type may include WiFi, ZigBee, Z-Wave, cellular Bluetooth, Bluetooth Low Energy (BLE), and the like. The device developer module 203 may also display build status of the devices 103, which specifies completion state of one or more devices 103, usage statistics associated with frequency of use of the devices 103, maintenance issues, and the like. The device developer module 203 may register new devices on the M2M application by determining the device type, device identification data, device communication information, wherein the communication information is based on a communication path and/or a communication technology type associated with the device. The device identification data may also include a device name, a device type, a device category/description, a brand, a model number, a version number, a communication type, and the like. In one implementation, when the device developer user registers the new devices and/or machines, the M2M application determines primary functionalities of the devices 103. In one embodiment, the primarily functionalities of the devices may include actions performed by the devices. For example, when the device developer user registers a thermostat in the M2M application, then the application determines that the primarily functionality of the thermostat is to sense temperature of a systems (e.g., in a room). Further, the device developer module 203 may add additional features in the M2M application, according to one embodiment. The additional features may include trigger mode change based on motion or light, output display (e.g., motion detected, light detected, etc.), measurements (e.g., motion, light, etc.), and the like in addition to existing features of the devices 103 such as set mode (e.g., home, away, energy saver, etc.), set temperature threshold (e.g., cool at temperature, heat at temperature, etc.), output (display temperature, humidity, usage, mode, etc.), etc.

Further, the device developer module 203 may extend a device model by providing utility services/applications to bind manufacturer device implementation models to the gateways 107. In other words, the device developer module 203 may enable the device developer user to create, read, update, or delete models to reflect manufacture specific capabilities in one embodiment. Next, the device developer module 203 measures readings of the device 103 by using the gateway 107, in one implementation. For example, the device developer module 203 may generate configuration files for the gateways 107 to handle sensor readings. The device developer module 203 may provide a gateway reference application having configuration files to optimize the readings of the devices 103. In one embodiment, the optimizations may include filter, transform, aggregate, summarize, and the like.

The device developer module 203 may search a device model from the device database 111, in one embodiment. The device model may be searched based on sensor and gateway protocol compatibility, metadata about sensors, applications associated with a gateway device, and the like. The device developer module 203 may set policies for the devices 103 and gateways 107 to provide secure certification (e.g., Secure Sockets Layer (SSL)). In one embodiment, the device developer module 203 encrypts each segment of the data transmitted over the Internet. Further, the device developer module 203 may publish their devices and/or application on a marketplace. In other words, the device developer module 203 may add appropriate information to sell their devices on an online catalog. A developer may be both a device developer and an application developer. In this case, the developer may be able to sell their device and/or application on an online catalog. The entries may include AEP device marketplace, and/or purchasing links, price, description, and the like. In another embodiment, the device developer module 203 presents one or more device developer interface options to the device developer user for providing inputs to the M2M application. In one scenario, one screen of the interface may display a list of one or more devices 103, and/or gateways 107 associated with the device developer user, second screen of the interface may display registration of a new device associated with the device developer user and a third screen of the interface may display a marketplace option for specifying pricing information for the devices, gateways associated with the device developer user.

The application user module 205 enables the application user to manage devices 103 (e.g., for home automation) with the developed M2M application in one embodiment. For example, the application user or a consumer may configure devices 103 with a control panel gateway device for a home automation project. The application user module 205 allows a gateway device to connect directly to a cloud network after registering the gateway device in the application, getting the network connectivity, setting up account, and the like. Further, the application user module 205 allows the application user to add applications, rules, or scripts for monitoring and managing the devices 103 locally, and/or from remote locations. In one scenario, the application user may expand the services to integrate with external local services such as local police department in case of emergencies, ambulance/healthcare for providing healthcare services such as life alerts, oil delivery/propane services, and the like. In another embodiment, the application user module 205 presents an application user interface to the application user for providing inputs to the M2M application. In one scenario, one screen of the interface may display a list of one or more devices, and/or gateways associated with the application user, second screen of the interface may display registration of a new device associated with the application user and a third screen of the interface may display a marketplace option to enable the application user to purchase the devices, gateways, and/or M2M applications.

The marketplace module 207 enables the device and/or application developer users to publish their devices and applications within an AEP developer portal in order to sell their devices and applications in one implementation. Further, the marketplace module 207 may provide news feeds from other device and/or application developers of the marketplace. In one embodiment, the marketplace module 207 generates a list of marketplace items to sell or leverage their M2M devices and/or applications. The AEP application marketplace may include information of the available devices and/or applications such as various applications for each device, device models, device configurations, device documentation, device simulators, gateway configurations, gateway application templates, gateway documentation, cloud application templates, Unified Resource Locator (URL) for purchasing applications, and the like. The marketplace listing may also include marketplace price of the M2M application. In an embodiment, authorized developer users having authenticated security credentials are allowed to add/change the marketplace listings.

The machine control module 209 allows creation, configuration, and processing of rules for the networked devices, sensor devices, gateways, and cloud applications in one embodiment. The machine control module 209 enables the application user to create end product solutions by configuring sensor devices, gateways, and the like. The machine control module 209 may develop scripts and rules which may be used to monitor and manage the rules locally or remotely. The machine control module 209 may be used, by the M2M application, to manage and control the devices changing various settings and preferences of the related device 103.

The machine data measurement module 211 measures data received from the devices or sensors 103. In one embodiment, the sensor data may include sensor/device level statistics, device health, device location, operational status, exception analysis, and the like. For example, for a thermostat, if the application user sets a reference temperature of the device at 90° F. and current temperature of the device is 70° F., then the data received from the sensors/devices is measured real-time or at regular intervals till the current temperature reaches to the reference temperature set by the application user. In another embodiment, the machine data measurement module 211 measures application data such as user defined metrics, trends, incorporating external social data, business oriented machine data, and the like. In one embodiment, device data is viewed and measured by the machine data measurement module 211 in real-time. Further, the machine data measurement module 211 determines device actions based on the primary functionalities of the devices. For example, the machine-to machine application determines whether the registered thermostat is sensing the temperature of the room or not.

In order to develop the M2M application, the modules of the AEP 101 interacts with the virtual repositories such as the gateway database 109, the device database 111, and the application database 113 as described in conjunction with description of the FIG. 1. Further, the application module 213 prompts the application user to select one of the M2M applications for the purpose of testing the devices 103 associated with the M2M application. For this purpose the application user may determine one or more machine options based on the selected M2M applications. The application user may track device data, view the real-time or history device data, and control device action.

Figure 3:
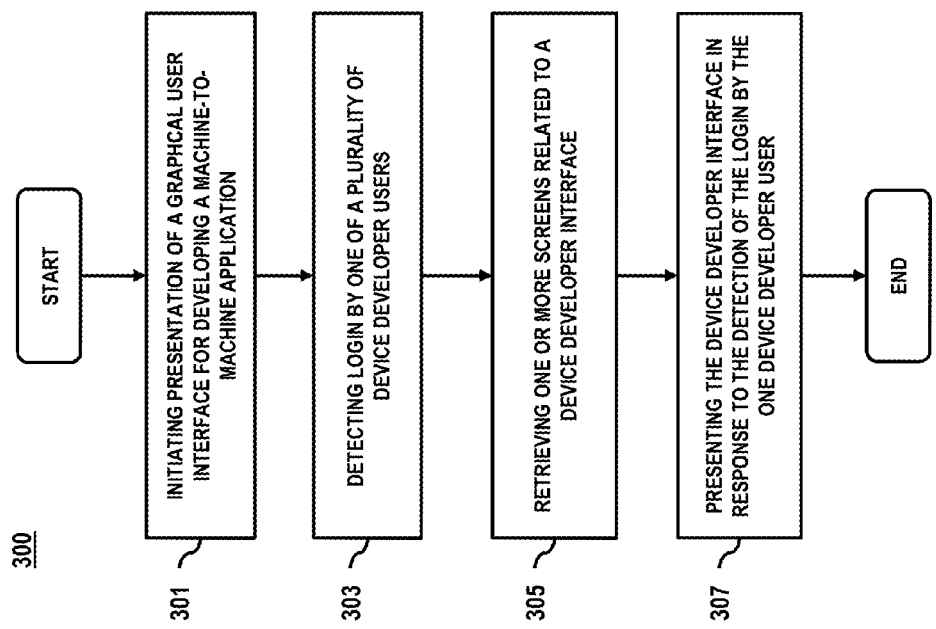
FIG. 3 is a flowchart of a process for enabling a device developer user to make a device available for M2M application development, according to one embodiment.

FIG. 3 is a flowchart of a process for enabling the device developer user to make a device available for the M2M application development, according to one embodiment. In one embodiment, the process may be executed by the device developer module 203. At step 301, the AEP 101 enables a graphical user interface (GUI) to develop a M2M application. For example, a login interface is presented to the device developer user to accept his login credentials. In one implementation, the login credentials of the device developer user may include a username and a password.

At step 303, login credentials accepted from the device developer user are authenticated in order to provide access to the device developer user. Login credentials may include any identifier (e.g. username) and/or password(s)/code(s) specifying who the device developer user is and what to provide the device developer user access. For example, a certain device developer user logs into the AEP 101 through a website or mobile/desktop application and is provided access to information regarding devices and/or applications related to the user in the AEP 101. Since each device developer user may be correlated to one or more different devices and/or applications each user is identified to list the related information.

At step 305, one or more screens of the device developer interface associated with the device developer user are retrieved. Following the example in the step 303, the GUI screens may be a GUI or simply informational, configured to the identified users' related device(s) and/or application(s) as described below in step 307.

At step 307, the retrieved device developer interface is then presented to the device developer user after authentication. The device developer user may then use this device developer interface to create and publish the M2M device. As previously mentioned, a developer may be both a device developer and an application developer, in which case the developer may also be able to create and publish an M2M application for his/her own device. In one embodiment, first section of the device developer interface may display a list of one or more devices or machines associated with the device developer user, a second section of the device developer interface may display an interface to register a new device, and third section of the device developer interface may display a marketplace option for the device developer user to specify pricing information for the one or more machines associated with the device developer user. In other embodiments, the device developer interface may also include application developer and/or application user interfaces.

Figure 4:
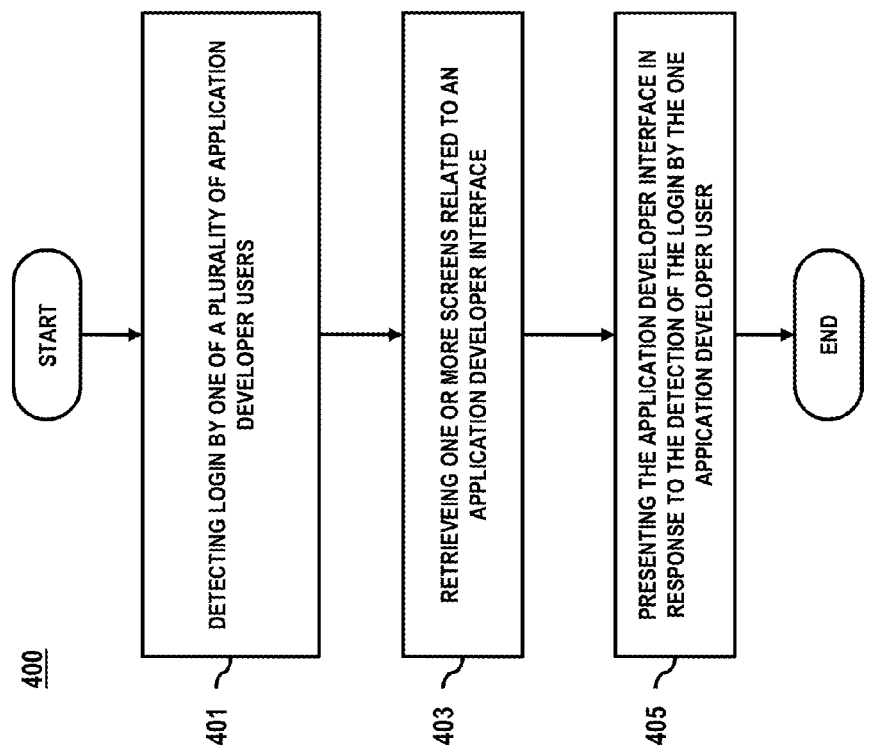
FIG. 4 is a flowchart of a process for enabling login of an application developer user to the AEP to access an application development interface, according to one embodiment.

FIG. 4 is a flowchart for enabling the application developer user to develop the M2M application, according to one embodiment. In one embodiment, the process may be executed by the application developer module 201. At step 401, login credentials of the application developer user is detected in order to provide authorized access to the application developer user. Login credentials may include any identifier (e.g. username) and/or password(s)/code(s) for specifying who the application developer user is and what to provide the application developer user access. For example, a certain application developer user logs into the AEP 101 through a website or mobile/desktop application and is provided access to information regarding devices and/or applications related to the user in the AEP 101. Since each application developer user may be correlated to one or more different devices and/or applications each user is identified to list the related information.

At step 403, one or more screens associated with the application developer interface are retrieved. Following the example in step 401, the screens may be GUI or simply informational, configured to the identified users' related device(s) and/or application(s) as described below in step 405.

At step 405, the retrieved application developer interface is then presented to the application developer user based on the login credentials provided by the application developer user. In one embodiment, first section of the application developer interface may display a list of one or more applications associated with the application developer user, a second section of the application developer interface may display information about the devices and/or machines that may be used as part of the M2M application development, a third section of the application developer interface may initiate for creating the M2M application for the devices and/or machines, and a fourth section of the application developer interface may display a marketplace option for the application developer user to specify pricing information for the M2M application. In other embodiments, the application developer interface may also include the device developer and/or application user interfaces.

Figure 5:
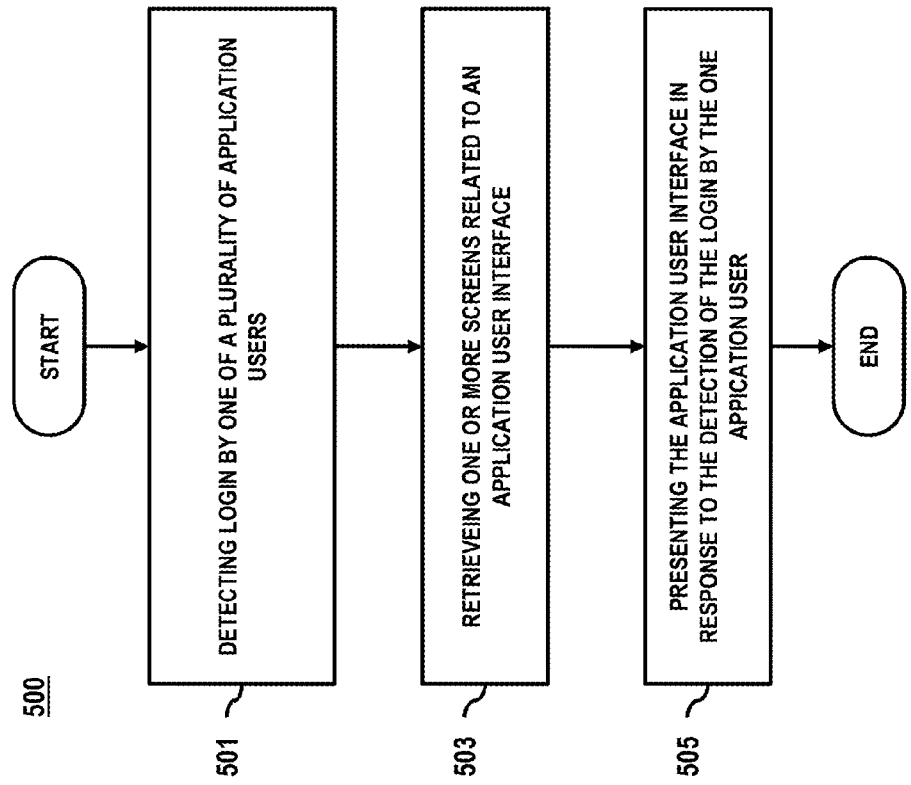
FIG. 5 is a flowchart of a process for enabling an application user to remotely access data related to the devices, according to one embodiment.

FIG. 5 is a flowchart of a process for enabling the application user to remotely access data related to the devices, according to one embodiment. The process may be executed by the application user module 205. At step 501, login credentials of the application user are accepted from the application user in order to provide authorized access to the application user. Login credentials may include any identifier (e.g. username) and/or password(s)/code(s) for specifying who the application user is and what to provide the application user access. For example, a certain application user logs into the AEP 101 through a website or mobile/desktop application and is provided access to information regarding devices and/or applications related to the user in the AEP 101. Since each application user may be correlated to one or more different devices and/or applications each user is identified to list the related information.

At step 503, one or more screens associated with an application user interface of the application user are retrieved. Following the example in the step 501, the screens may be GUI or simply informational, configured to the identified users' related device(s) and/or application(s) as described below in step 505.

At step 505, the retrieved application user interface is then presented to the application user based on the login credentials provided by the application user. In one embodiment, first section of the application user interface may display a list of one or more devices or machines, gateways, and applications associated with the application user, a second section of the application user interface may display an interface to register a new devices and/or machines, and/or gateways associated with the application user, a third section of the application user interface displays a marketplace option for the application user to purchase one or more devices and/or machines, gateways, M2M applications. In other embodiments, the application user interface may also include device developer and/or application developer interfaces.

Figure 6A:
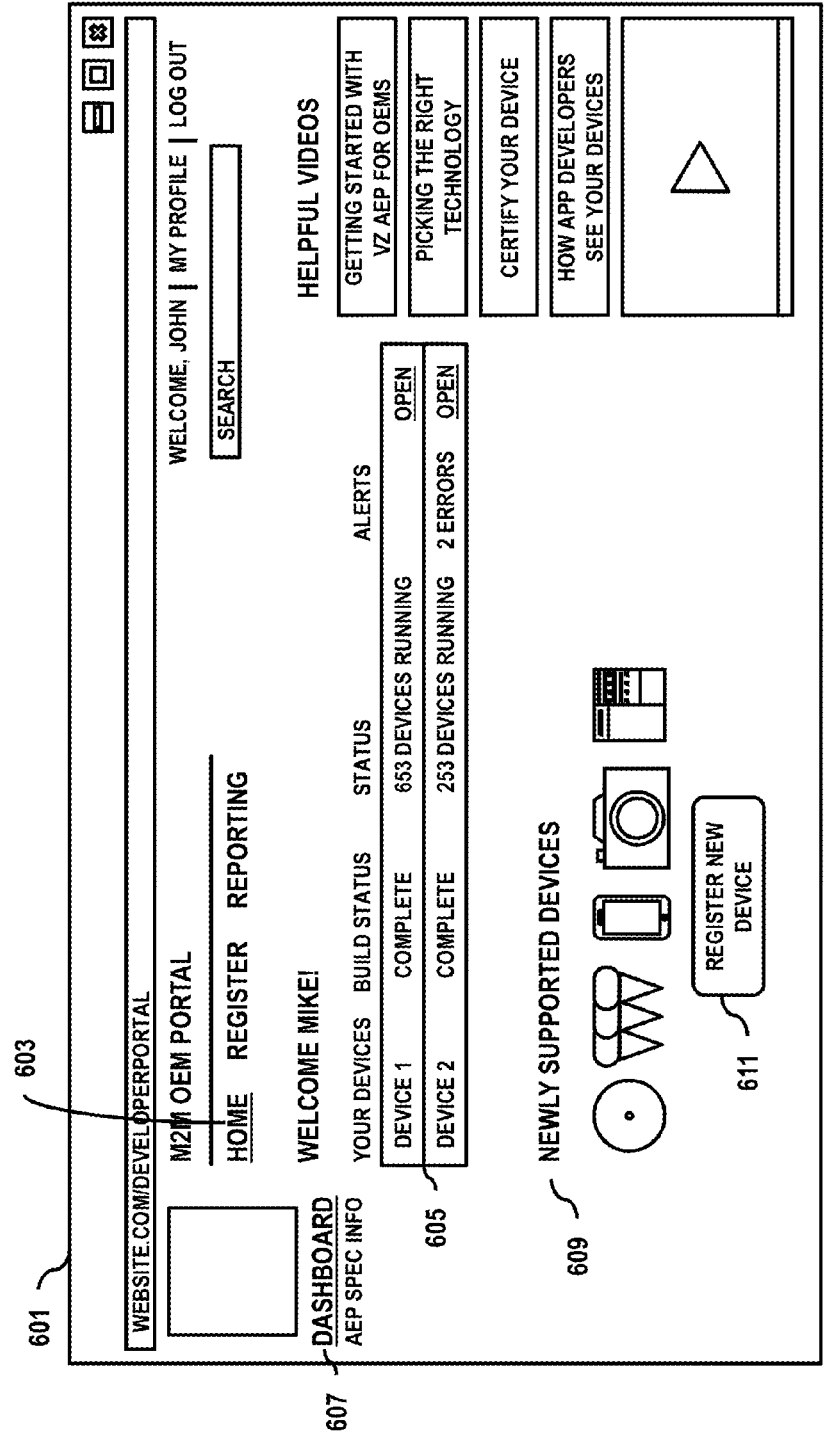
FIGS. 6A-6D are diagrams of a device developer interface for enabling M2M application development, according to one embodiment.

FIGS. 6A-6D are diagrams of a device developer interface for enabling M2M application development, according to one embodiment. FIG. 6A displays the device developer interface 601 for displaying information of existing devices associated with the device developer user. The device developer interface 601 provides device semantics to support M2M communication in the cloud environment. In one embodiment, the device developer interface 601 may be considered as sensor models for the device developer users to develop the compliant devices or applications. The device developer interface 601 may provide a device runtime overview, according to an embodiment. The device developer interface 601 may include a home screen form 603 to display device information 605 associated with the device developer user. The device information 605 may include a device name, a build status, a device status, alerts/errors, and the like. The device information 605 is displayed when the device developer user clicks on a dashboard icon 607. Further, the device developer interface 601 may display a list of newly supported devices 609 in the application. If the device developer user desires to add a new device to the application, then the device developer user may select from the newly supported devices and then register the new device by using a register new device icon 611. In some embodiments, the device developer interface 601 may also display links or icons of videos that may help the device developer user while developing the application. In one embodiment, the videos may include user guide videos, pick the right technology for devices, certify your devices, how application developer can see devices, and the like.

Figure 6B:
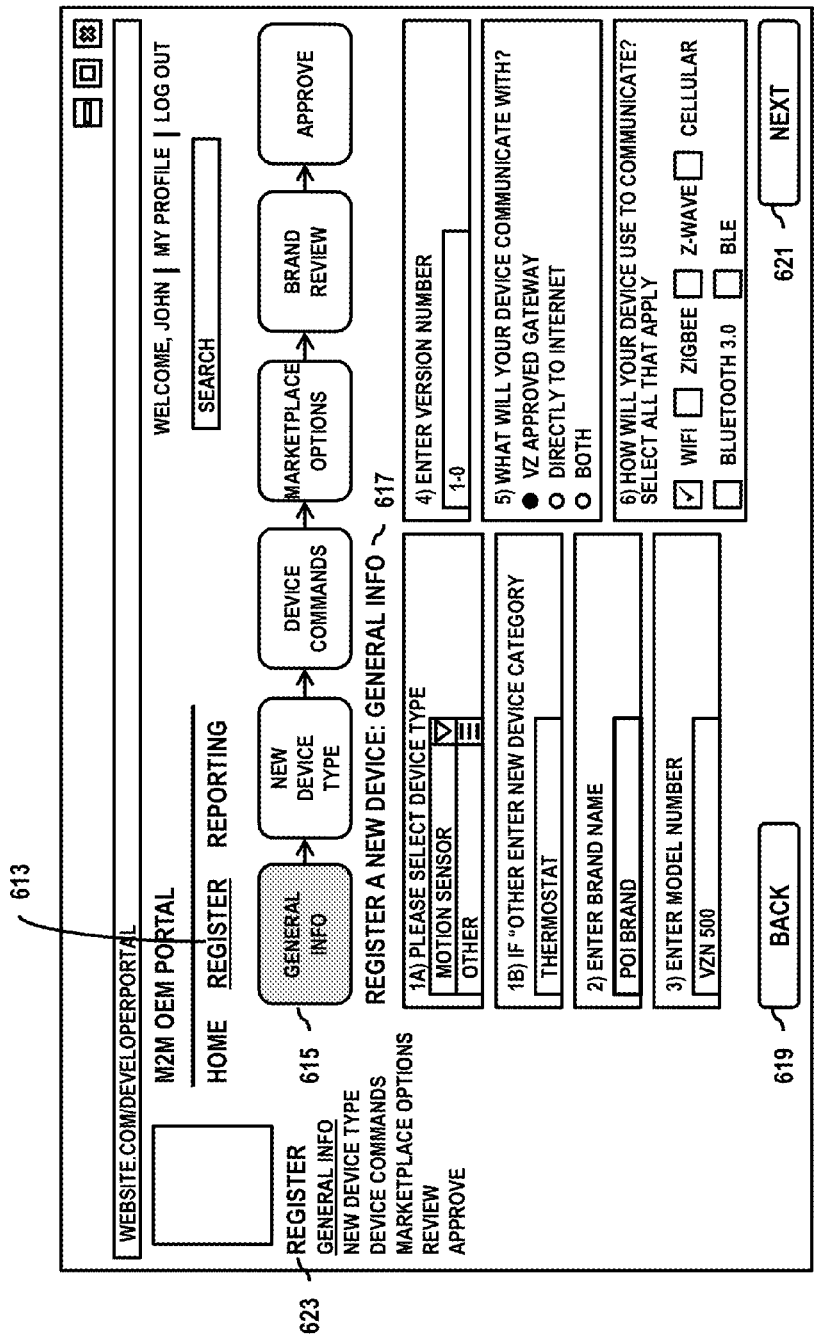

FIG. 6B is a diagram of the device developer interface 601 to register a new device, according to one embodiment. The device developer user builds a new device and/or gateway and then uses the device developer interface 601 to register the device. The device developer interface 601 includes a register screen 613 to register a new device in the application. When the device developer user clicks on the register icon, the device developer interface 601 displays a number of options to register the new device in the application. In one implementation, a general info icon 615 having an icon of register a new device 617 is displayed by which the device developer user may register the new device by providing general information about the device. The general info of the device or the identification data may include a device type, a device category, a brand name, a model number, a version number, a communication type (e.g., a service provider approved gateway, directly to the Internet, etc.), a device communication technology (e.g., WiFi, ZigBee, cellular, Bluetooth, etc.), and the like. The device developer user may navigate to the home screen by using back icon 619 and may navigate to a next screen when the device developer user clicks on next icon 621. In one scenario, the device developer user may select a device model and upload configuration of the selected device by using the options displayed register screen 613 of the interface 601. The device developer interface 601 may also display a register icon 623 to select a general info icon 615 in order to provide general information about the new device and to register the new device.

Figure 6C:
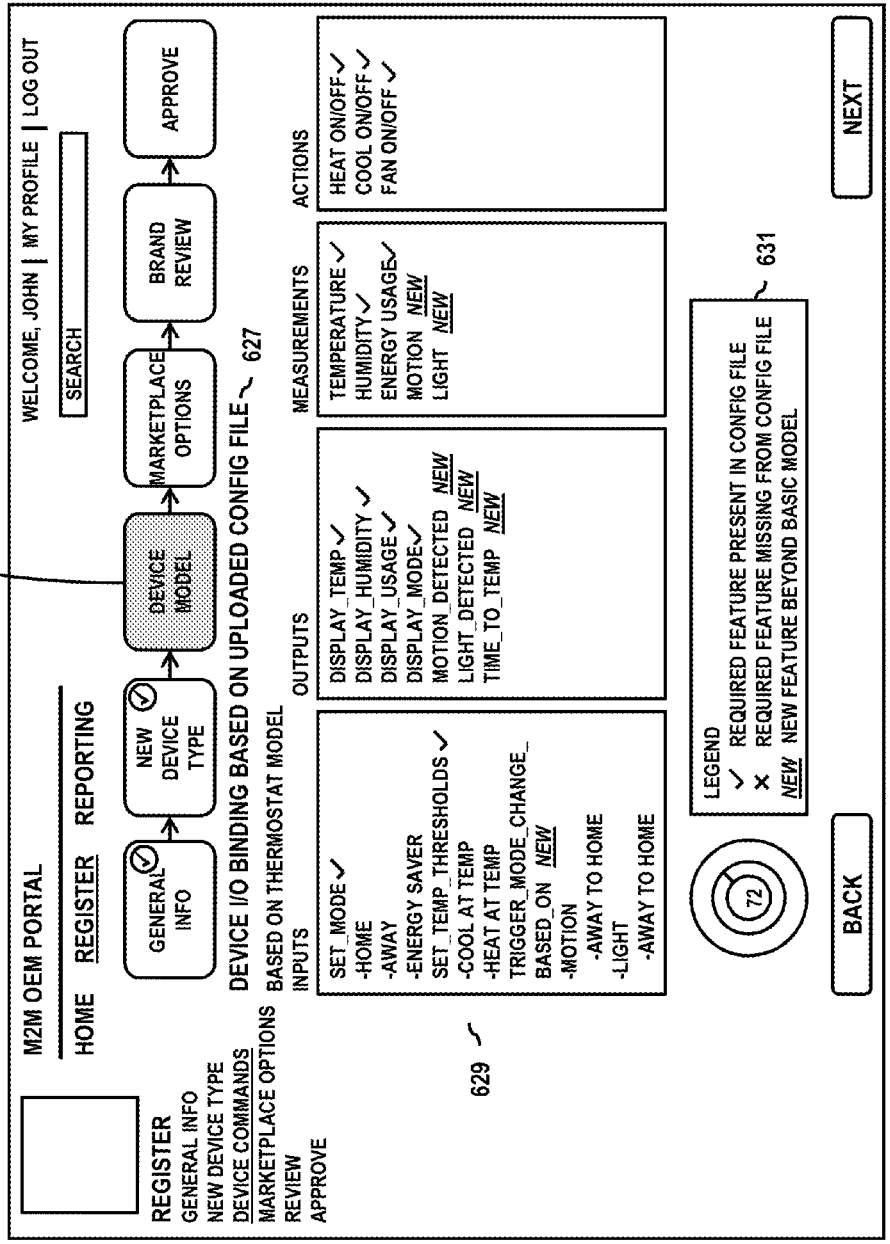

FIG. 6C is a diagram of the device developer interface 601 to define sensor/device model, according to one embodiment. The device developer user may further click on a device model icon 625 to view device model specifications. The device model icon 625 may display device input/output binding based on the uploaded configuration file 627 to check whether all the features of the selected device were met with the device developer user specifications. The device developer user may further add new features in the device by using a screen portion 629 to display inputs, outputs, measurements, actions, and the like. In one embodiment, the device developer user may add additional features of the new device in the application which may be used by devices of another brand. For example, if a M2M application development company comes out with a new thermostat that also supports motion and light detection, then they may use this new model that was created when the new thermostat was on-boarded to the platform, while previous version of application can still work with the new hardware based on old device model without modification. A screen portion 631 may display status of the features such as features required in configuration file, required feature missing from the configuration file, new feature added in the basic model.

Figure 6D:
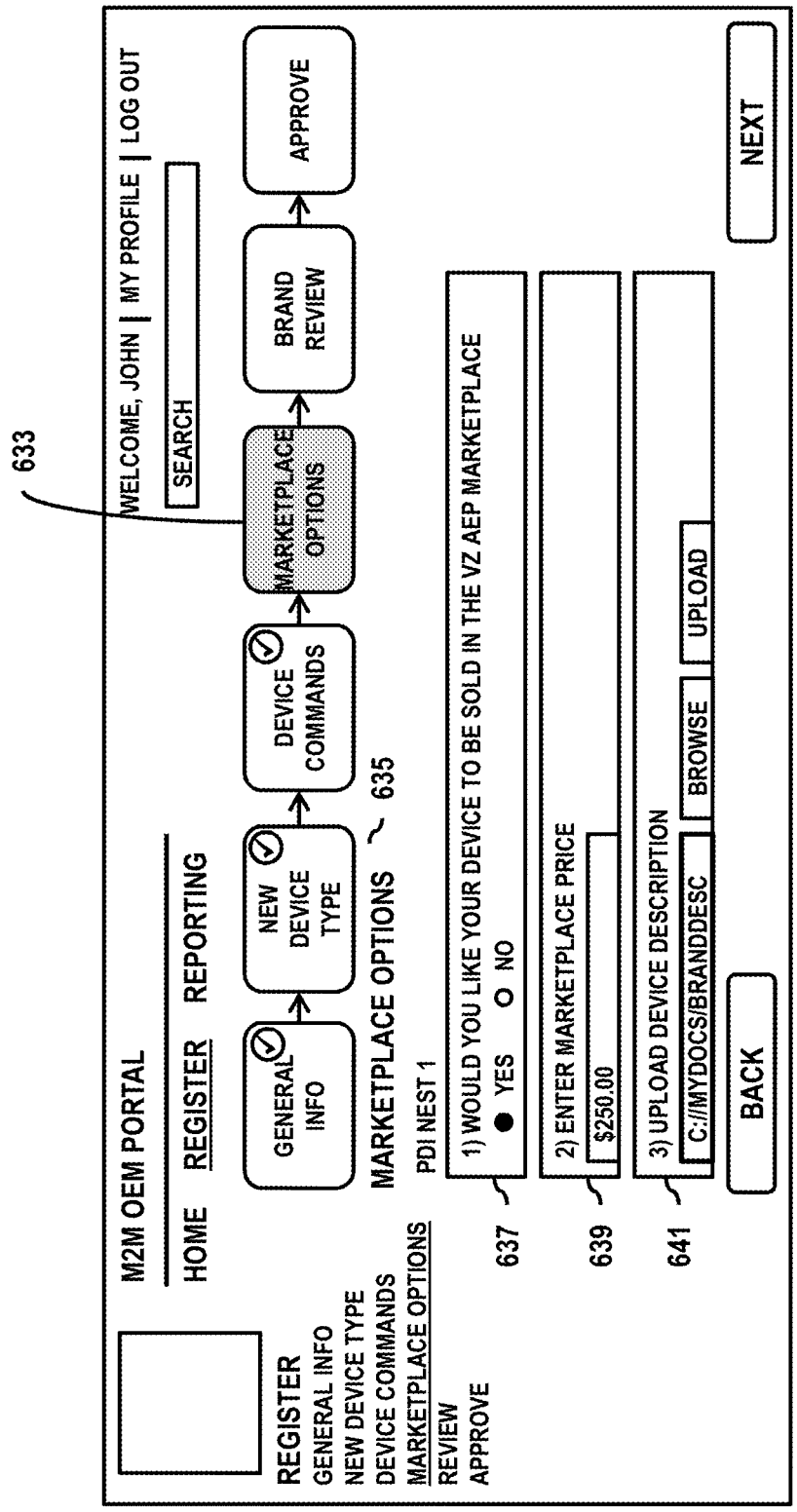

FIG. 6D is a diagram of the device developer interface 601 to enter sales information of the device and to publish it on a marketplace to sell the device, according to one embodiment. In the device developer interface 601, a marketplace option icon 633 is selected by the device developer user to enter sales information of the device and to publish it on an online catalog in order to sell the device. A marketplace options screen 635 of the interface 601 displays multiple options to the device developer user, such as whether the device developer user desires to sell the device 637. When the device developer user desires to sell the device in the marketplace, then the device developer user selects "yes" option. Further, the device developer user may enter marketplace price 639 of the device an also upload device description 641. In one embodiment, the device developer user may also upload an image of the device in the device developer interface 601.

Figure 7A:
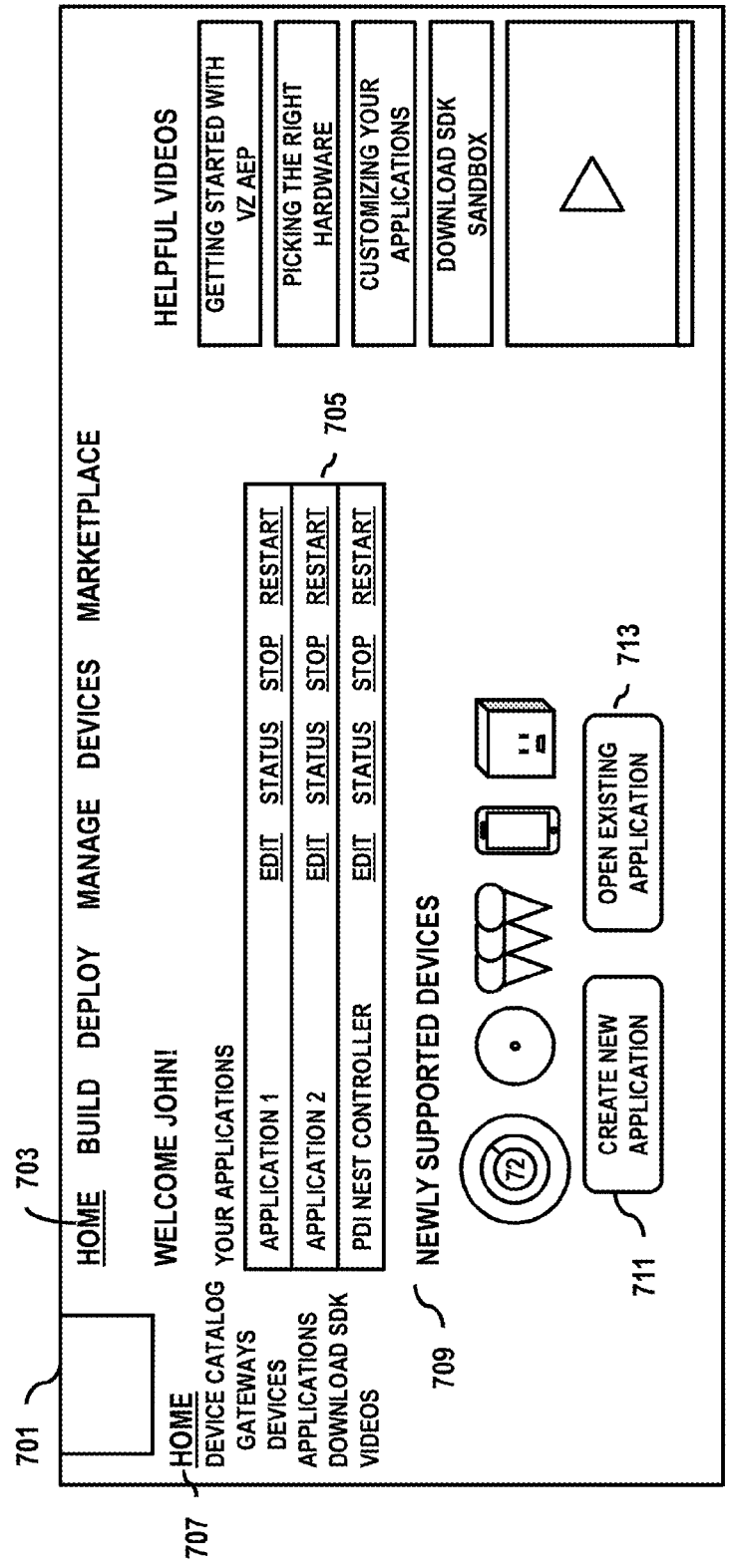
FIGS. 7A-7O are diagrams of an application developer interface for enabling M2M application development, according to one embodiment.

FIGS. 7A-7O are diagrams of an application developer interface for enabling M2M application development, according to one embodiment. FIG. 7A is a diagram of an application developer interface used in enabling the M2M applications. The application developer interface 701 displays a home screen icon 703 to display applications 705 associated with the application developer user. The application developer interface 701 may also display various options associated with the applications 705, wherein the options may include edit, status, stop device, restart the application, and the like. Profile information of the application developer user and associated applications may be displayed when the application developer user clicks on a home icon 707. Further, the application developer interface 701 may display a list of newly supported devices 709 in the application. If the application developer user desires to add a new application for the devices, then the application developer user may create a new application by selecting a device from the listing by clicking on a create new application icon 711. Further, the application developer user may view existing applications by clicking on an open existing application icon 713. In some embodiments, the application developer interface 701 may also display links or icons of videos that may help the application developer user while creating the application. In one embodiment, the videos may include user guide, picking the right hardware, customizing application, download SDK sandbox, and the like.

Figure 7B:
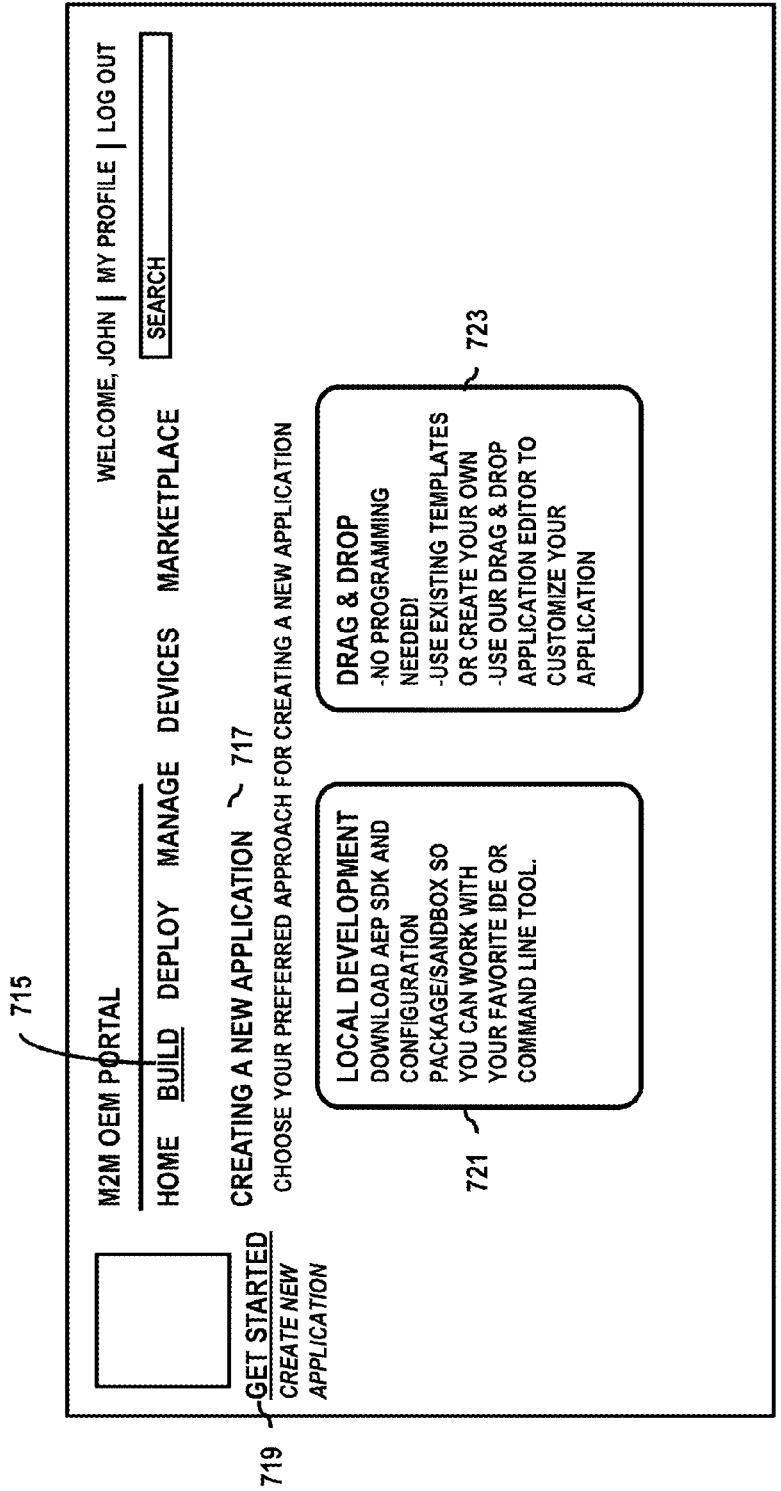

FIG. 7B is a diagram of the application developer interface 701 to build or create a new application, according to an embodiment. The application developer interface 701 may enable the application developer user to create a new application by clicking on a build option 715. Once the user clicks on the build option 715, a form for creating a new application option 717 is displayed on the application developer interface 701. The application developer user may select an approach to create the application by clicking on a get started icon 719. The application developer user may select either a local development approach 721 or a drag and drop approach 723 in order to create the application. When the application developer user selects the local development approach 721, then the application developer user may develop the application by downloading AEP 101 SDK and configuration sandbox. On the other hand, the application developer user may also develop the application by selecting a drag and drop approach that uses existing templates to develop the M2M application. The application developer user may also customize the application by using the drag and drop approach, in one embodiment. In this, no programming is required while developing the application.

Figure 7C:
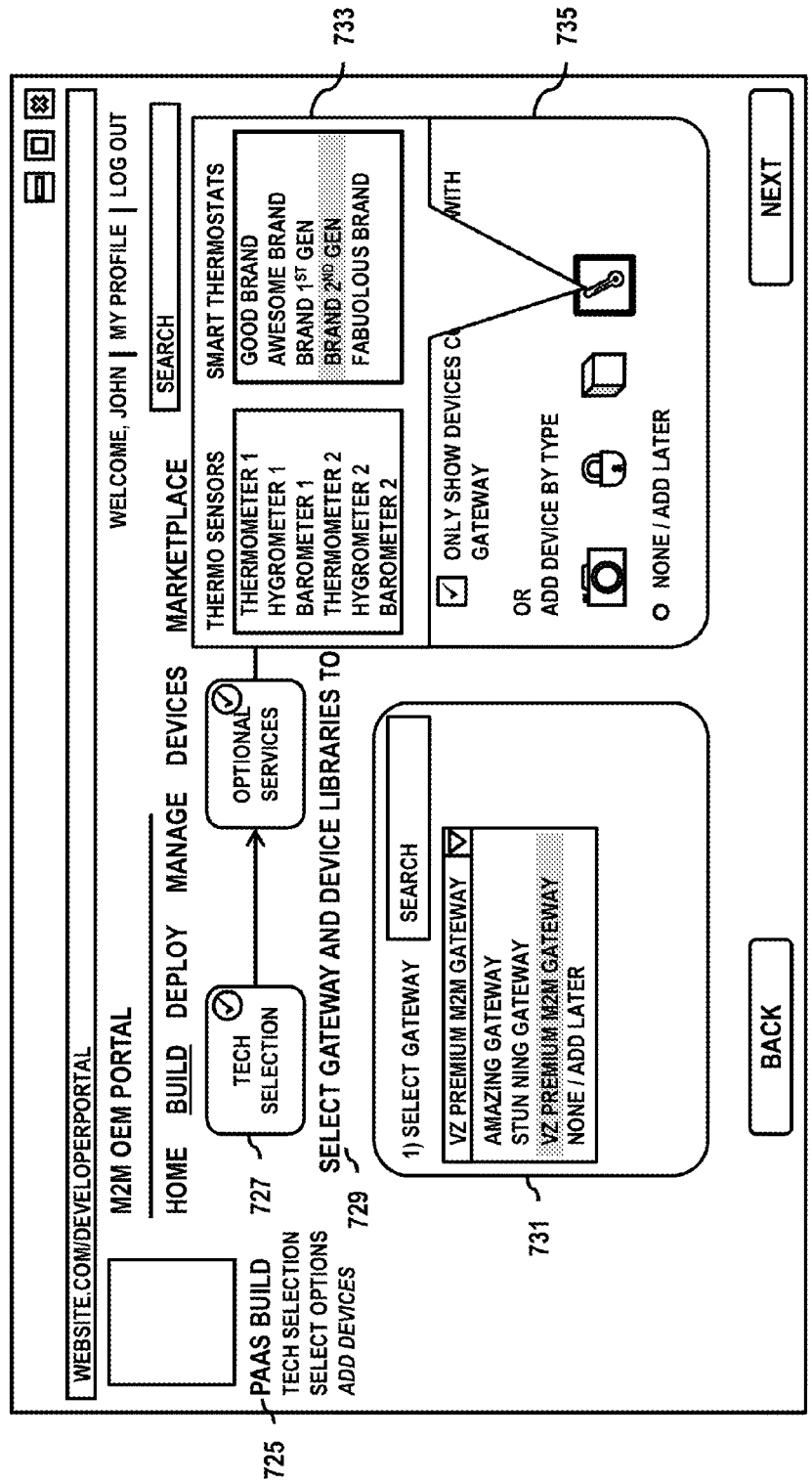

FIG. 7C is a diagram of the application developer interface 701 to accept inputs from the application developer user based on the type of technology to build the application according to an embodiment. The application developer user selects a Platform as a Service (PaaS) icon 725 to build the application. The application developer interface 701 may also display process icons 727 upon which the application developer user begins the application creation process. The process icons 727 may include a technology selection (e.g. Java, Node.js, PHP for use with the application), optional services selection and additional device selection which may be added into the M2M application. The application developer user may specify gateways and device libraries which may be used by the application to define the gateways and devices in section 729 and then selecting the gateway 107 from a list of the gateways 731. The application developer user may further select device types from a list 735 (e.g., thermo sensors and smart thermostats) by selecting from the listed device types 733. In one embodiment, the application developer user selects gateways to build and test the application.

Figure 7D:
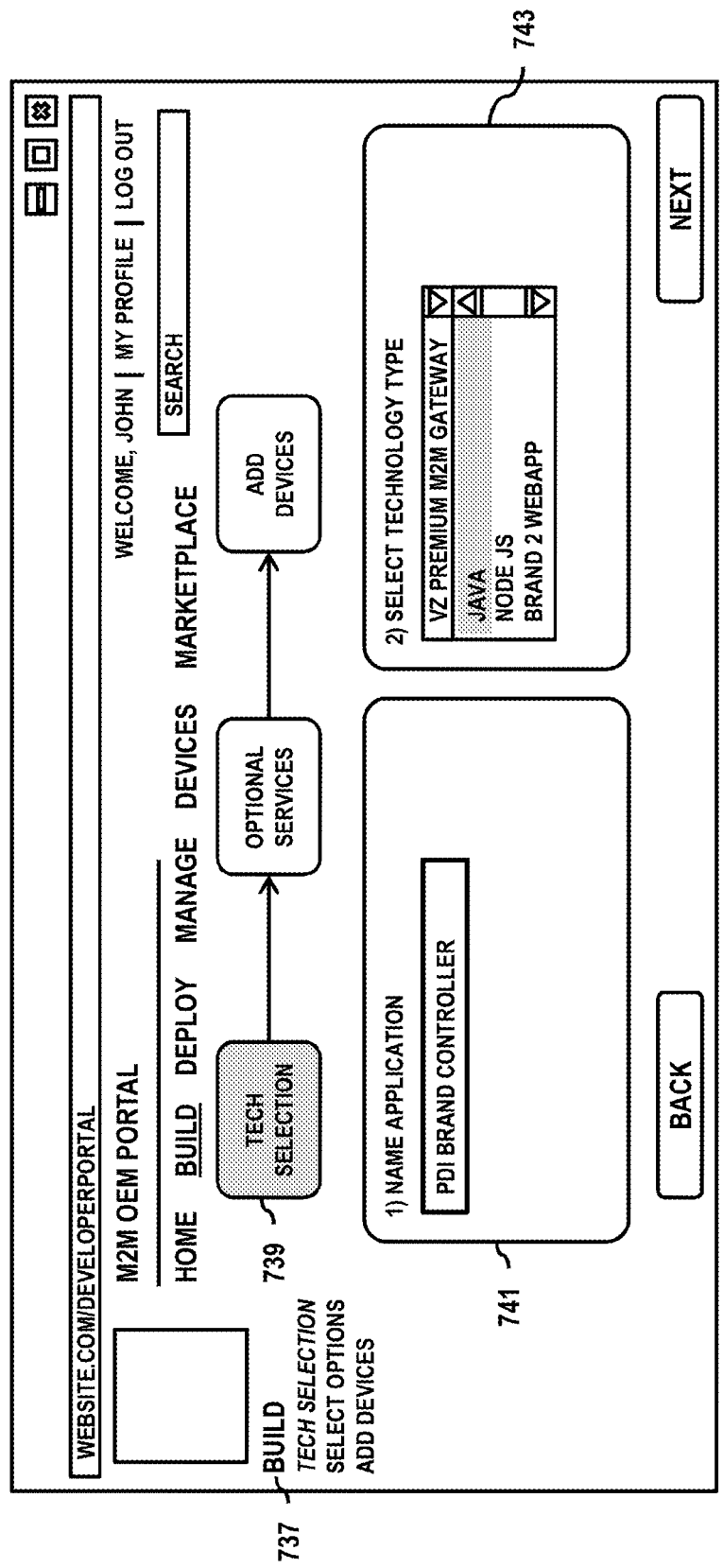
Figure 7E:
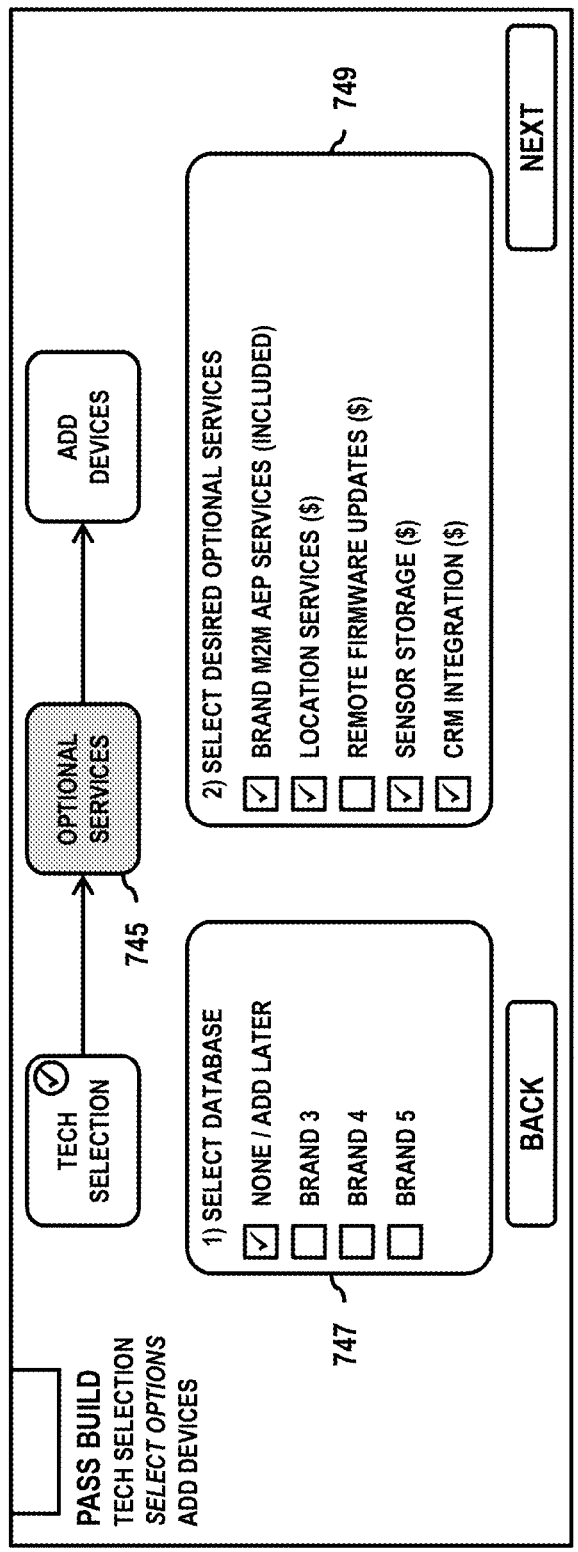

The application developer user may select a build option 737 in the application developer interface 701 to select technology, the application is configured to use under the technology selection icon 739, as shown in FIG. 7D. The application developer user may define an application name 741 (e.g., PDI controller or using another application defining naming convention) and a development technology type 743 (e.g., Java, Node.js, etc.) from the application developer interface 701. Once those are selected the application developer user may further select additional or optional services from a selection icon 745, as shown in FIG. 7E. The additional services may be selected by selecting a database 747 for storing application data. The application developer user may further select desired optional services 749. The optional services may include brand M2M AEP services, location services, remote firmware updates, sensor storage, Customer Relationship Management (CRM) integration, and the like.

Figure 7F:
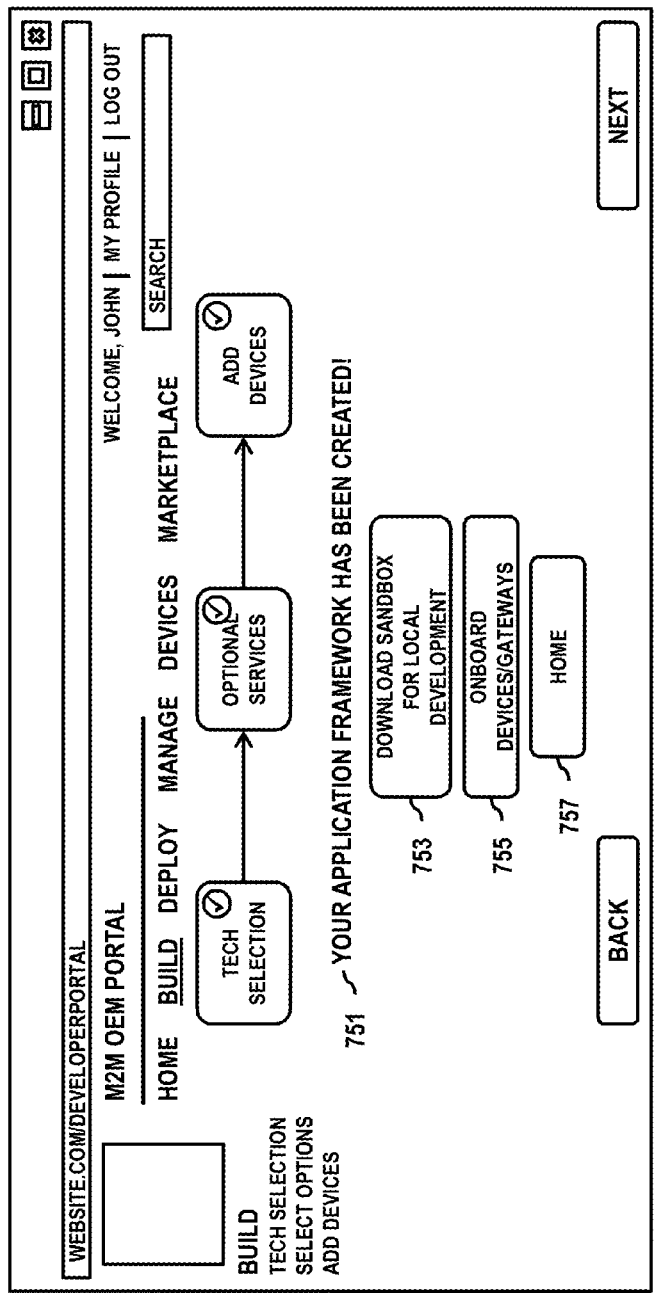

Further, the application developer interface 701 displays a message 751 stating that the application has been developed based on the inputs received from the application developer user as shown in FIG. 7F. In other embodiments, the message 751 may be generated to display any errors or issues that prevented the application from being created. The application developer user may then download their customized AEP sandbox on a local development environment by clicking on an icon 753. If the application developer user desires to optimize the existing application, then the application developer user may select devices and/or gateways by clicking on an onboard devices/gateways icon 755. The application developer user may navigate to the home screen by clicking on a home option 757.

Figure 7G:
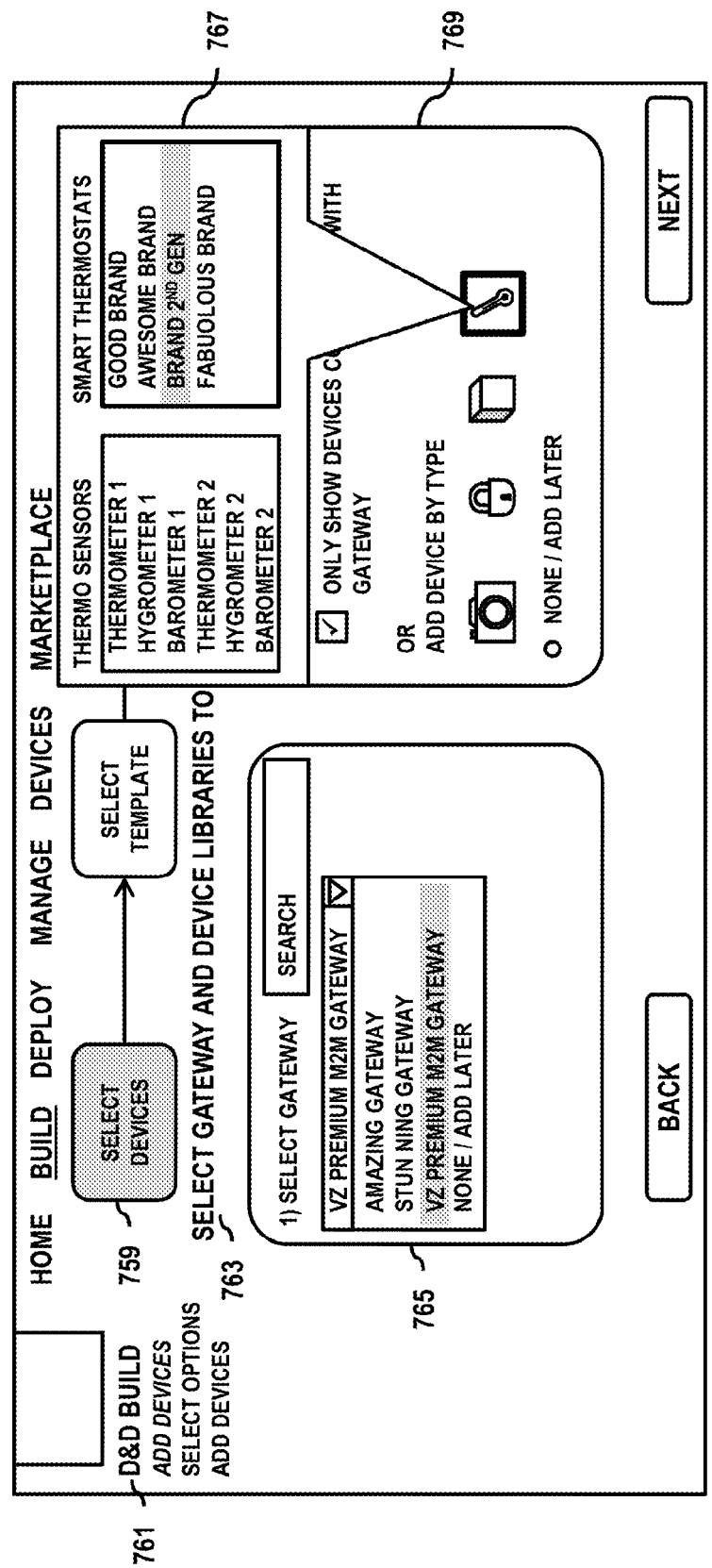
Figure 7H:
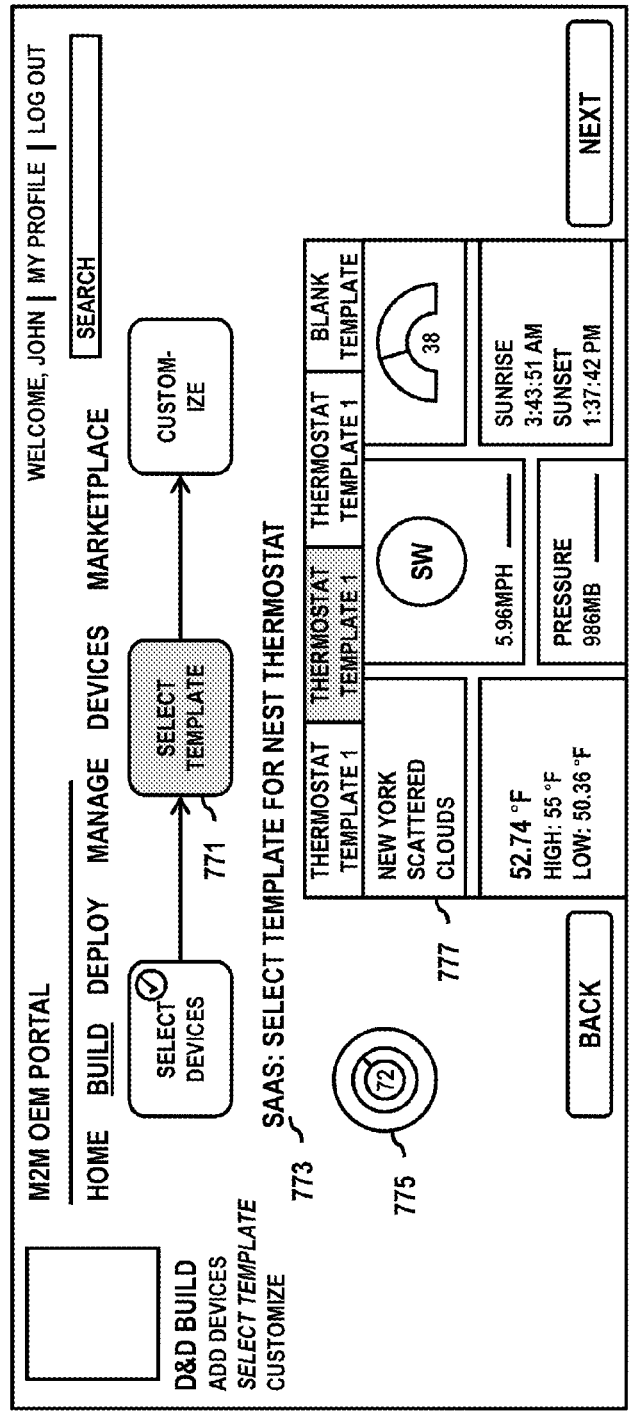
Figure 71:
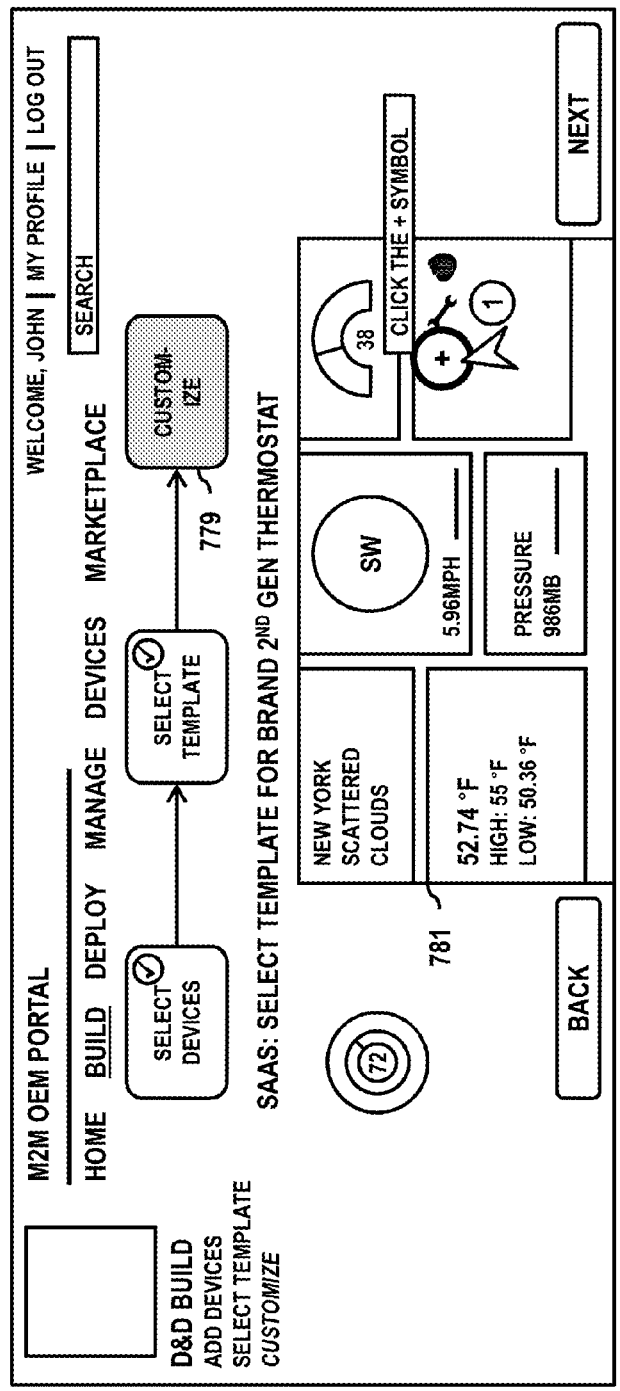
Figure 7J:
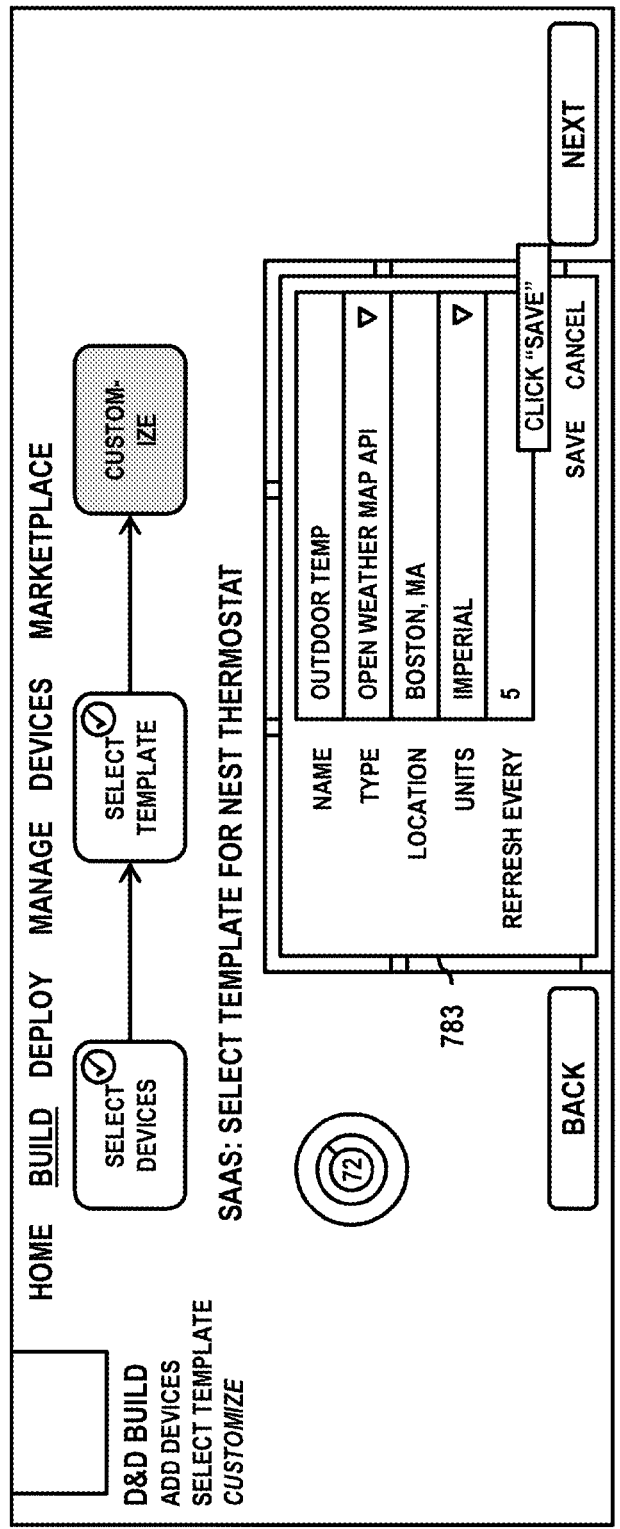
Figure 7K:
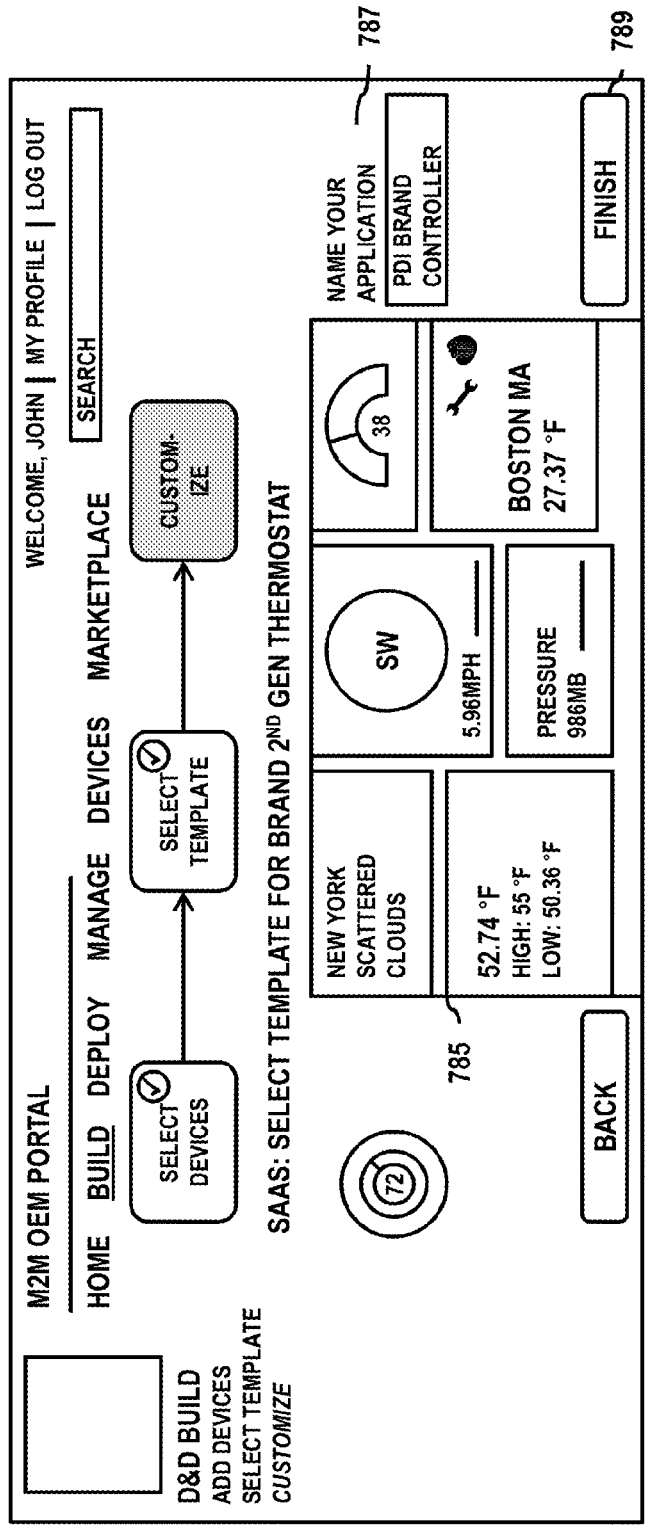

FIG. 7G is a diagram to build the application in an Integrated Development Environment (IDE) by using the drag and drop approach on a web-based interface. In one embodiment, the application developer user selects devices by clicking on an icon select devices 759. The application developer user selects a drag and drop build option 761 to build the application. The application developer user may further add gateways and device libraries to the application by defining the gateways and devices in section 763 and then select a gateway type from a list of the gateways 765. The application developer user may further select device types from list 767 (e.g., thermo sensors and smart thermostats) by selecting a listed device type 769. In one embodiment, the application developer user selects the gateways to build and test the application. As shown in FIG. 7H, the application developer user may then select a template option 771. The application developer interface 701 may further display the type of software as a Service 773 (e.g., SaaS) to select a template for the device information. In one embodiment, a device icon 775 (e.g., a thermostat icon or other sensor icon) may display current temperature of the device and also displays multiple templates 777 used in displaying information collected from the device. The application developer user may then select one or more of these templates to build the application. Further, the application developer user may customize the application by selecting a customize option 779, in one implementation. The application developer user may add templates (e.g., Widgets) to the application by clicking on an add symbol (+) which is selected from available spaces or by adding pages within a template 781 as shown in FIG. 7I. The application developer user may also remove widgets to the application by selecting a subtract symbol (−) which may be selected from available widgets through secondary selections. For example, right clicking on a widget to show the removal symbol. As shown in FIG. 7J, the application developer user may add an additional template 783 (e.g., outdoor temperature monitor or other templates for additional known information) in the application template. As shown in FIG. 7K, in one embodiment, the application developer user may further customize the template by selecting the template section 785 of the application developer interface 701 to vary the interface and may edit and view the name of the application in section 787. The application developer user may complete application customization by clicking on a finish icon 789.

Figure 7L:
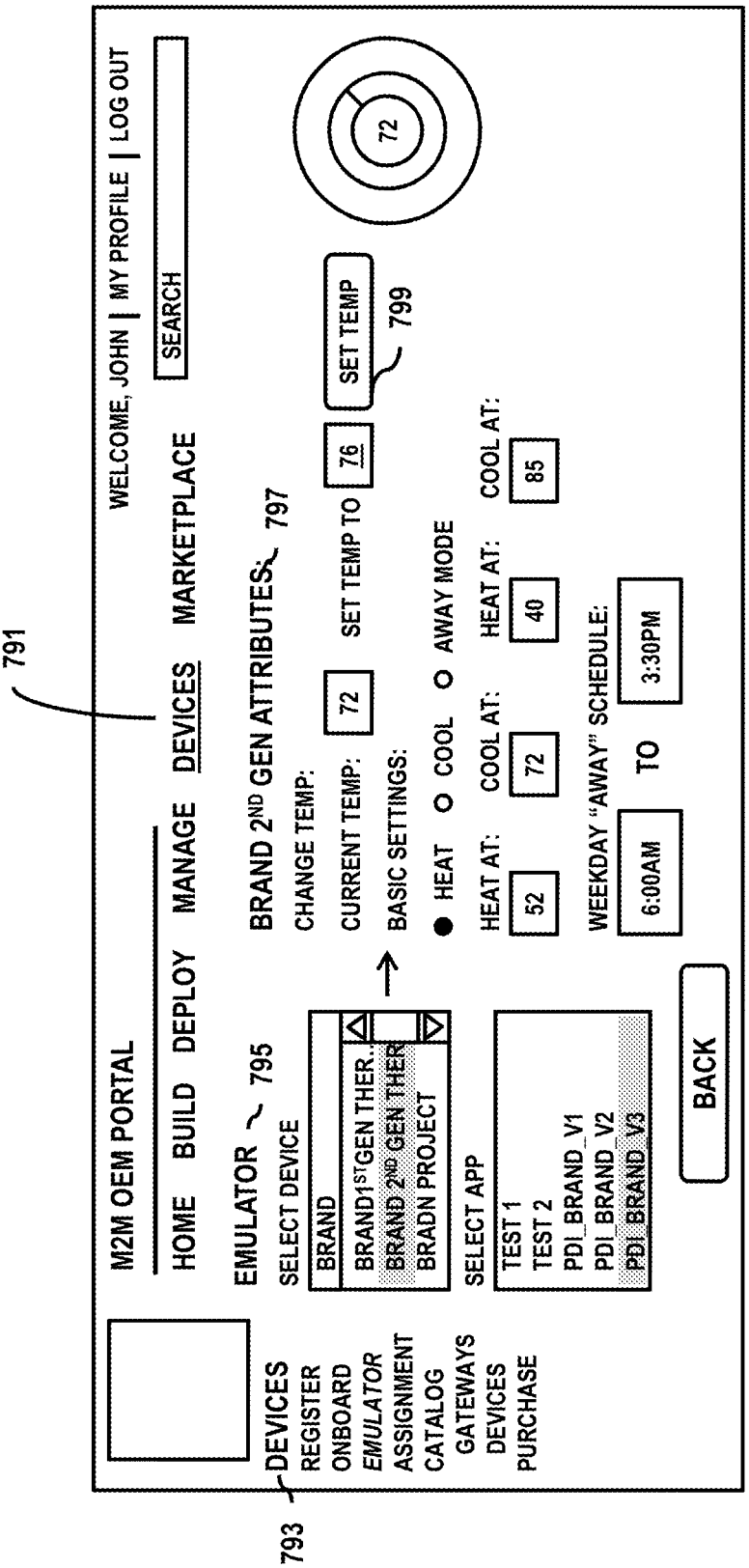
Figure 7M:
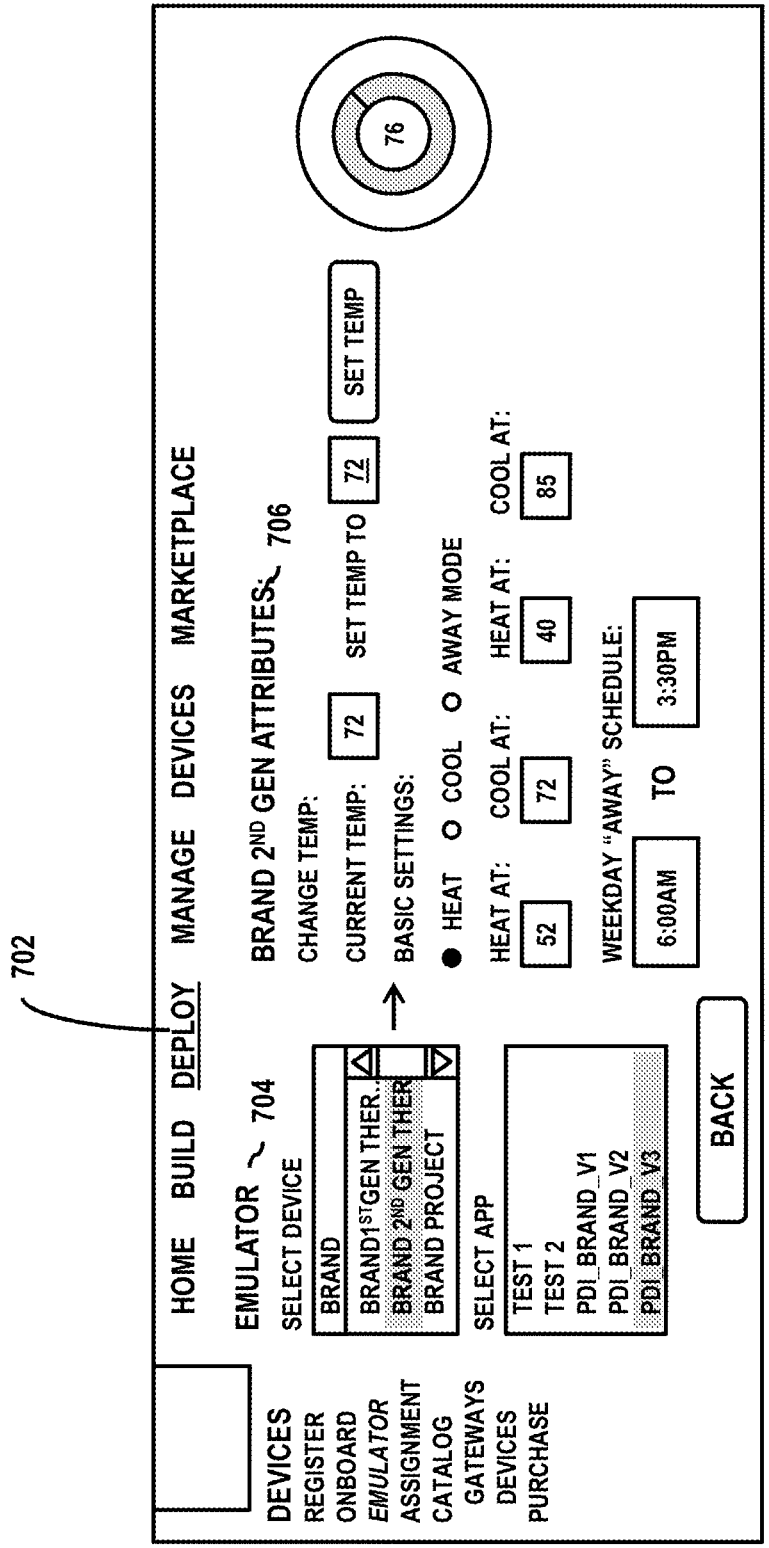
Figure 70:
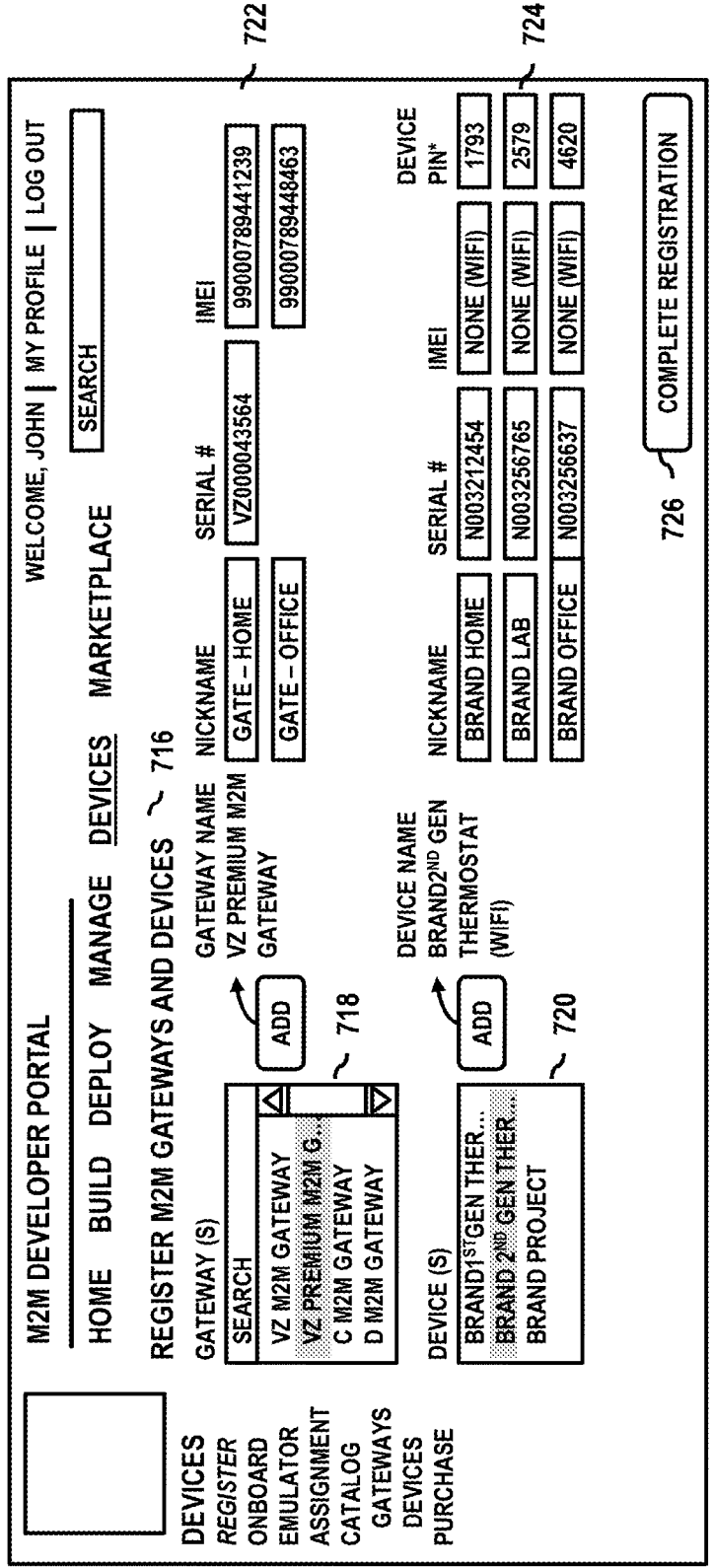

The application developer user may debug the application with device emulators as shown in FIG. 7L. The application developer user selects a device option 791 and then selecting an emulator option 793. The application developer interface 701 may then display emulator option 795 to select a device, its attributes 797, and to set the attributes of the device (e.g., set temperature) 799. The attributes may include current temperature, reference temperature, modes (heat, cool, away, etc.), and the like. In one embodiment, the application developer may test the application by using an emulator for eliminating the need of processing physical hardware device to test the application. As shown in FIG. 7M, the application developer user may deploy the application by selecting a deploy option 702, an emulator device 704, and its attributes 706. The attributes may include current temperature, reference temperature, modes (heat, cool, away, etc.), and the like.

FIG. 7N is a diagram to manage the application by the application developer user in one embodiment. In one implementation, the application may have a dashboard to integrate data feeds from the PaaS and other operational machine-to-machine system such as wireless connectivity management system. The dashboard provides monitoring metrics on the device, and application usage tracking as shown in the FIG. 7N. In one implementation, the application developer user may manage the application by selecting a manage option 708 in the application developer interface 701. The application developer user may manage the application by viewing health status 710 of the application such as CPU usage, bandwidth, and the like. The application developer user may further select desired optional services 712. The optional services may include brand machine-to-machine AEP services, location services, remote firmware updates, sensor storage, Customer Relationship Management (CRM) integration, and the like. The application developer interface 701 may further display information 714 of the applications such as application name, number of activated devices, number of transactions, bandwidth usage, etc. As shown in FIG. 7O, the application developer user may select device options to register gateways and/or devices by selecting an option 716 in one embodiment. The application developer user may select a gateway 718 and a device 720 from a list of gateways and devices. In one embodiment, the application developer user may provide identifiers, serial number and/or International Mobile Station Equipment Identity (IMEI) of the gateways 722 and of the device 724. The application developer user may then complete the registration by clicking on a complete registration option 726.

Figure 8A:
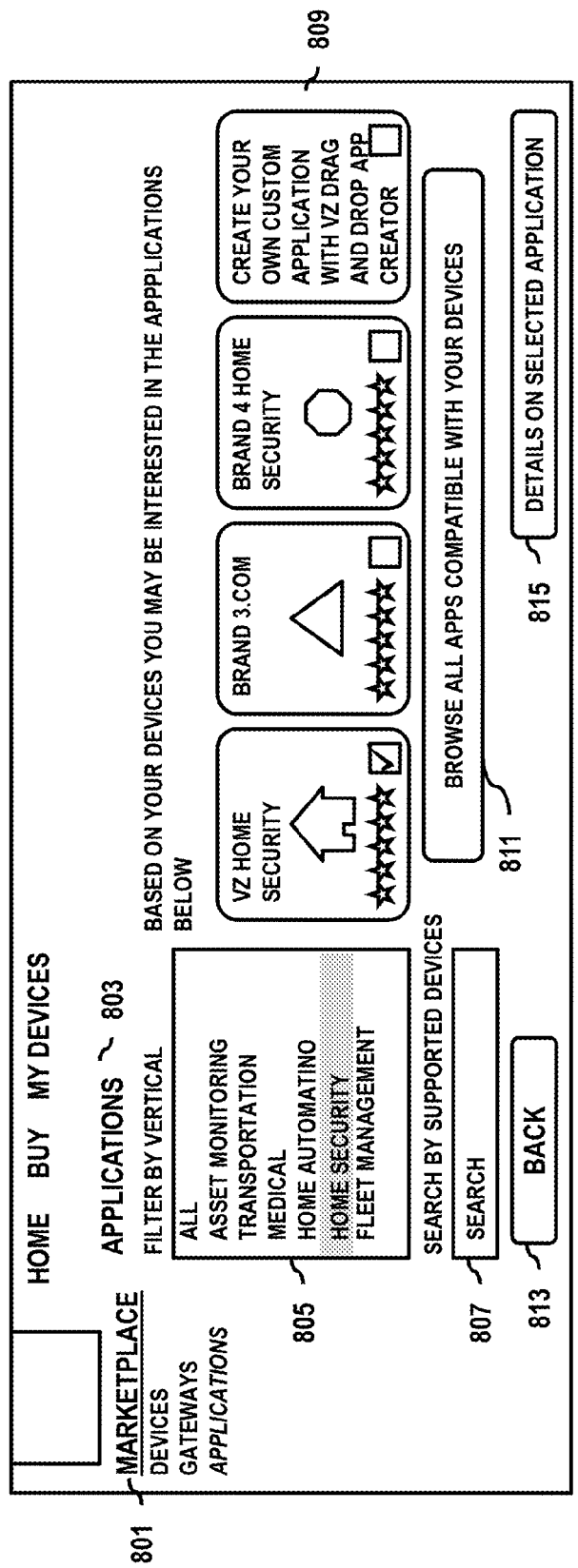
FIGS. 8A-8C are diagrams of an application user interface for enabling the application user to purchase the M2M applications and devices, according to one embodiment.
Figure 8B:
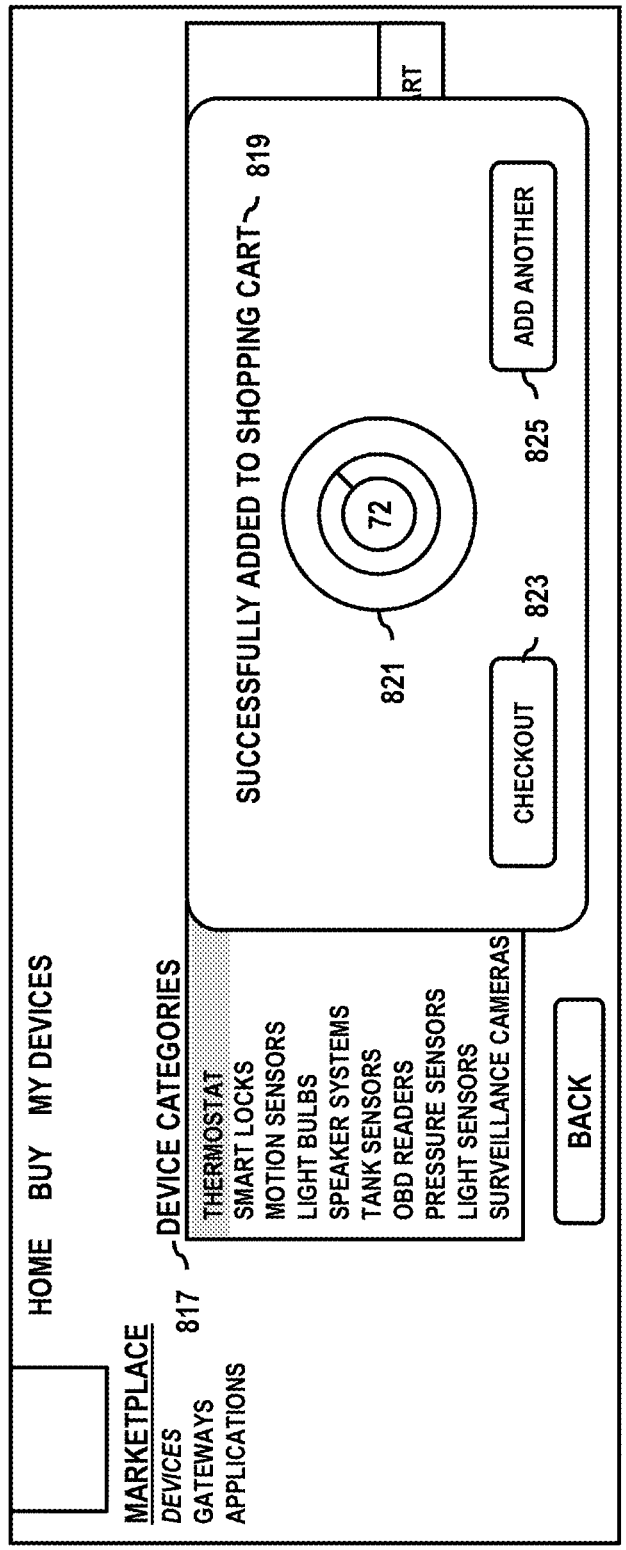
Figure 8C:
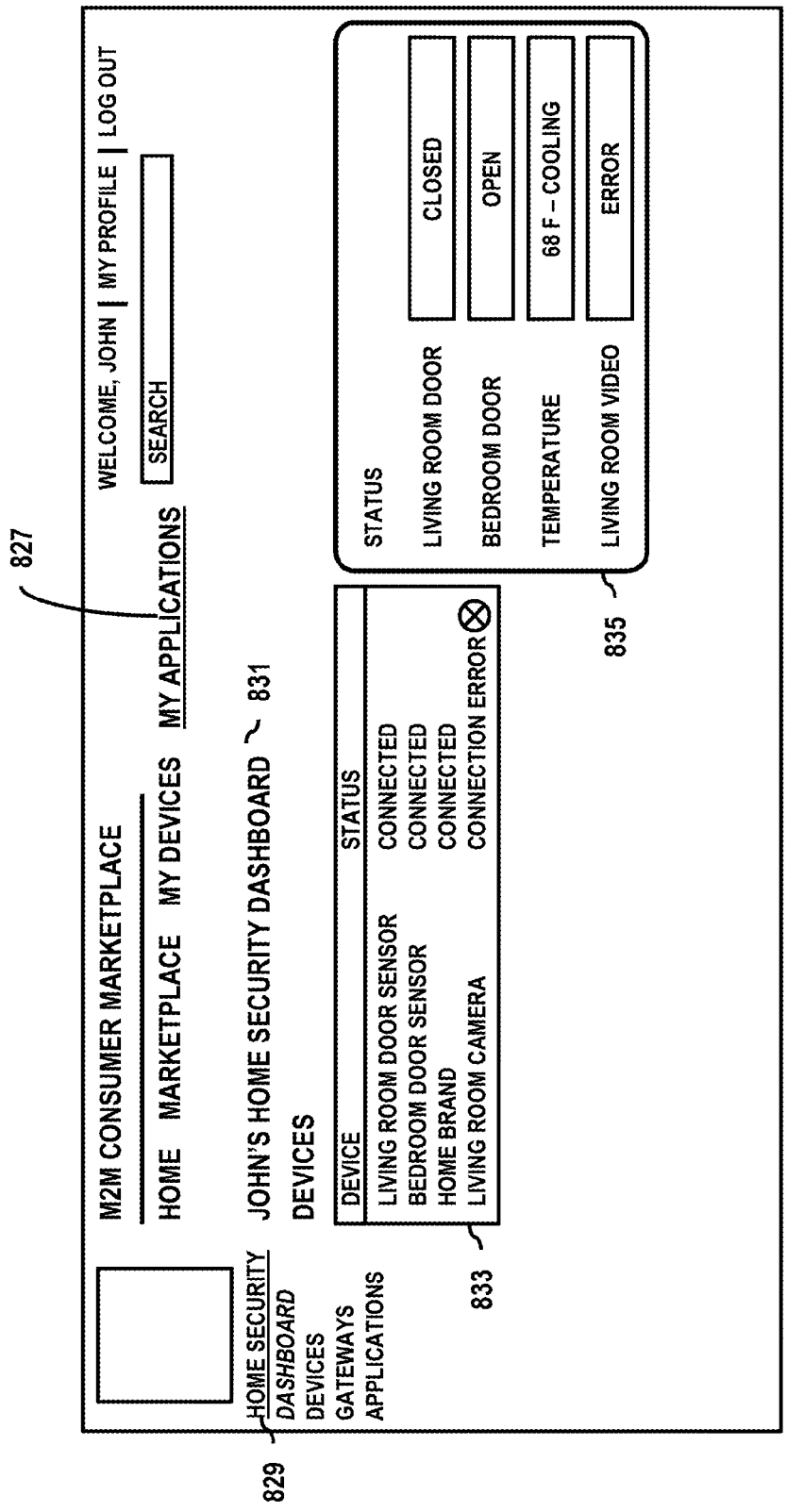

FIGS. 8A to 8C are diagrams of the application user interface for enabling the application user to purchase the M2M application, according to one embodiment. In one scenario, the application user or a consumer may purchase the devices and/or applications and its compatible devices from a marketplace. In another embodiment, in the marketplace, applications, devices, and gateways may be independently developed and sold. The application user may select a marketplace option 801 to purchase devices, gateways, and/or applications. In one embodiment, the application user selects an application option 803 from a list of applications 805. The application list may include asset monitoring, transportation, medical, home automation, home security, fleet management, and the like. In another embodiment, the end user may search for the application based on the supported devices 807. Further, based on the device selected by the end user, a number of application options may be suggested to the end user. In another embodiment, the end user may be provided applications based on devices corresponding to their account information. This application may be selected from a displayed list 809. In another embodiment, the end user may search for the applications that are compatible with the user device by selecting a browse option 811 as shown in FIG. 8A. Further, the application user may view additional details (e.g., cost, additional device controls, etc.) of the application by clicking on an option 815.

As shown in FIG. 8B, in one embodiment, the application user may select devices for purchase. The application user may select device categories by selecting a device categories option 817. Based on the application user selection, the device is added to a shopping cart of the application user 819, and an image of the device is displayed 821. Further, the application user may checkout from his account by clicking on the checkout option 823 or may add another device to the shopping cart by clicking on an add option 825. In another embodiment, the user may find out additional details about the device.

FIG. 8C is a diagram to display applications and devices associated with the application user, according to one embodiment. The application user may select "my application" option 827 to view the application user's applications and their status associated with the devices. For example, the application user selects home security option 829 to view the applications. Further, a dashboard of the application user 831 displays the devices and their status 833 to the application user. Further, the dashboard 831 may also display detailed description of the status 835 of a device such as of a living room door sensor. The detailed description of the status may include status of living room door (e.g., Open or close), temperature, error in capturing living room videos, and the like.

Figure 9:
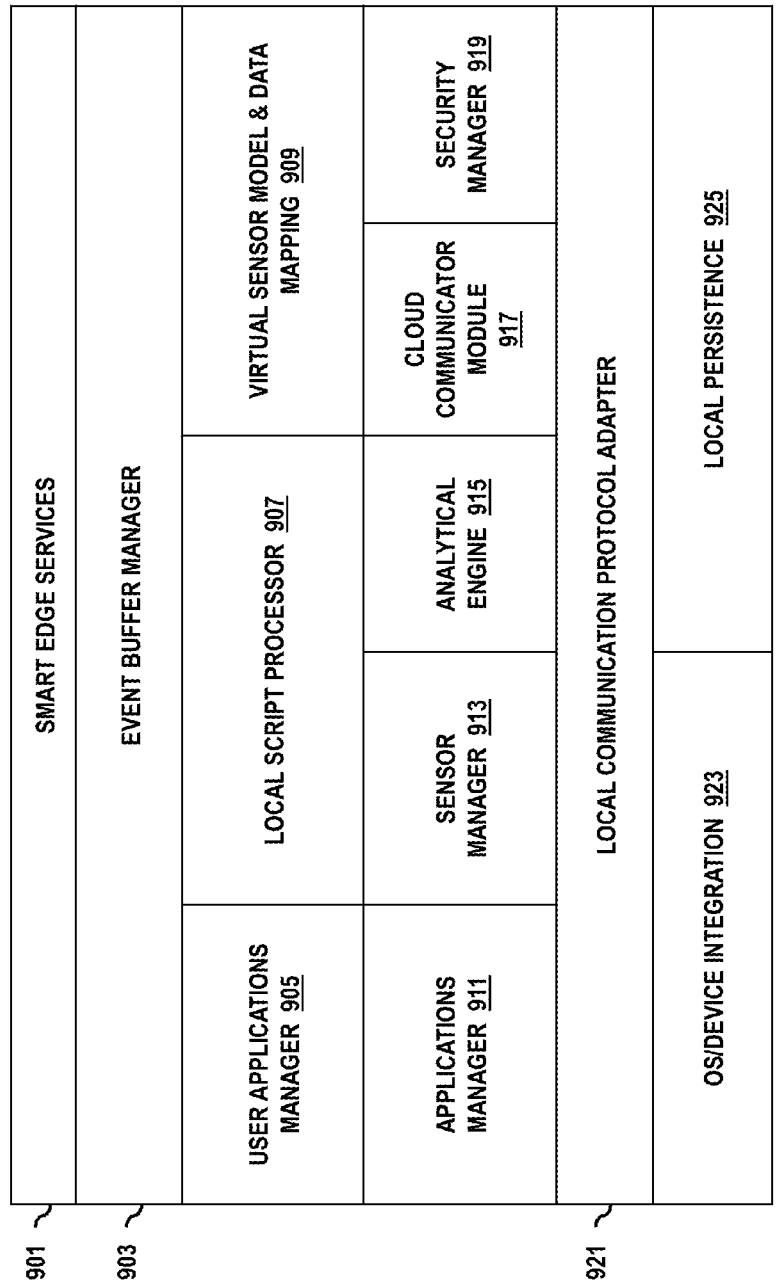
FIG. 9 is a diagram of a gateways and its key components associated with the AEP, according to one embodiment.

FIG. 9 is a diagram of the gateway and its key components associated with the AEP 101 for developing different M2M applications, according to one embodiment. The AEP 101 may include a smart edge service 901, an event buffer manager 903, a user applications manager 905, a local script processor 907, a virtual sensor model & data mapping 909, an applications manager 911, a sensor manager 913, an analytical engine 915, a cloud communicator 917, a security manager 919, a local communication protocol adapter 921, an OS/device integration 923 and a local persistence 925.

In one embodiment, the AEP 101 enables the smart edge service 901 for allowing the developers to access different resources available for developing the M2M application.

The event buffer manager 903 of the AEP 101 enables to buffer different resources which are accessed by the multiple developers. The user application manager 905 manages all the applications running on gateways, which may include applications developed by the user or by third parties, and may be accessed by third party users. Further, the local script processor 907 processes scripts used for the development of M2M application and converts them into a standardized script for controlling the data from the devices 103. The virtual sensor model & data mapping module 909 virtually represents sensor devices 103 for the development of M2M application, further, the data mapping module 909 enables to map the data received from the devices 103 with the application developed by the developers. The applications manager 911, enables updating, deleting and modifying of application modules running on gateways. Further, the sensor manager 913 manages different sensors available in the network for the M2M application. The data collected from sensor manager 913 is used by the analytical engine 915 to analyze the performance of different M2M application and accordingly suggest modifications if there is inconsistency in data. Further, the cloud communicator module 917 enables the communication between sensors and AEP cloud systems. The cloud communicator module 917 provides a secure communication from the gateway 107 to cloud, secure communication from cloud to gateway 107. Further, the cloud communicator module 917 provides data and command mapping between the devices 103 and cloud. Further, the cloud communicator module 917 enables support to flexible protocol such as HTTP, HTTPS, CoPA, and the like. Furthermore, the cloud communicator module 917 enables sensor device management by discovering the new devices, alarms, firmware management and the like. The security manager 919 provides a secure login to the developers and third party users of the AEP platform. Further, the local communication protocol adapter 921, OS/device integration 923 and local persistence 925 enable specifying the message format for communication between different sensors sensor OEMs or gateway OEMs with the M2M applications.

Figure 10:
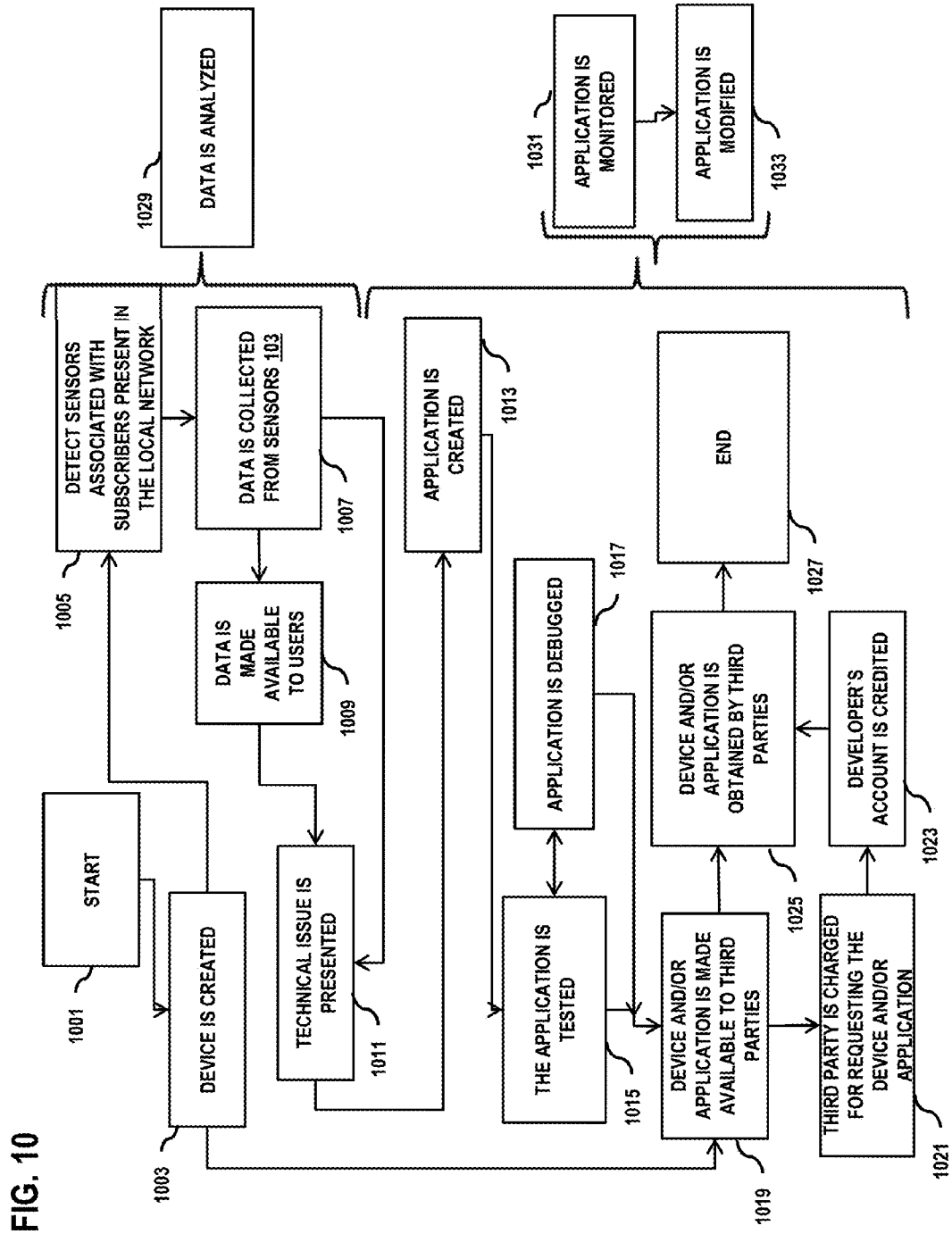
FIG. 10 is a flowchart for developing a M2M application associated with a device or a sensor, according to one embodiment.

FIG. 10 is a flowchart for developing a device profile and/or M2M application and monitoring their performance, according to one embodiment. The process of developing new device and/or new M2M application is classified into phase 1 and phase 2. In phase 1, data from the devices 103 is analyzed by using the device and M2M application developed by the device and/or application developers. The phase 1 is represented by step 1029 and further involves sub-steps from 1001 to 1011. At step 1001, the process of developing the new device is initiated based on the inputs provided by the device developer user. Initially, inputs such as login credentials of users and password is accepted from the developer for login into the system. In the next step, the device developer interface 601 is displayed to the developer user for developing the device. At step 1003, a virtual device is created by the developer user using the device developer interface 601 as described in FIGS. 6A to 6D. At step 1005, the sensor devices 103 present in the local network and associated with the device are present to the developer. At step 1007, data is collected from the devices 103 associated with the device. At step 1009, the data collected from the devices 103 is presented to the developer for further analysis. At step 1011, the technical issues associated with the data collected from the devices 103 are presented to the developer user for further analysis.

Further, the developed device and M2M application is monitored in phase 2. The phase 2 is represented by steps 1031 and 1033 and further involves sub-steps from 1013 to 1027. At step 1013, the M2M application is created for the device created at step 1003. The M2M application is created as described in the FIGS. 7A to 7O. Once the M2M application is developed, it is tested and debugged at step 1015 and 1017. At step 1019, the device and/or M2M application is made available to the third party users. At step 1021, third party users are charged for requesting the device and/or M2M application. At step 1023, the developer user account is credited by the amount charged to the third party users. At step 1025, the device and/or M2M application is obtained by the third parties once the amount is debited to the developer user's account.

Figure 11:
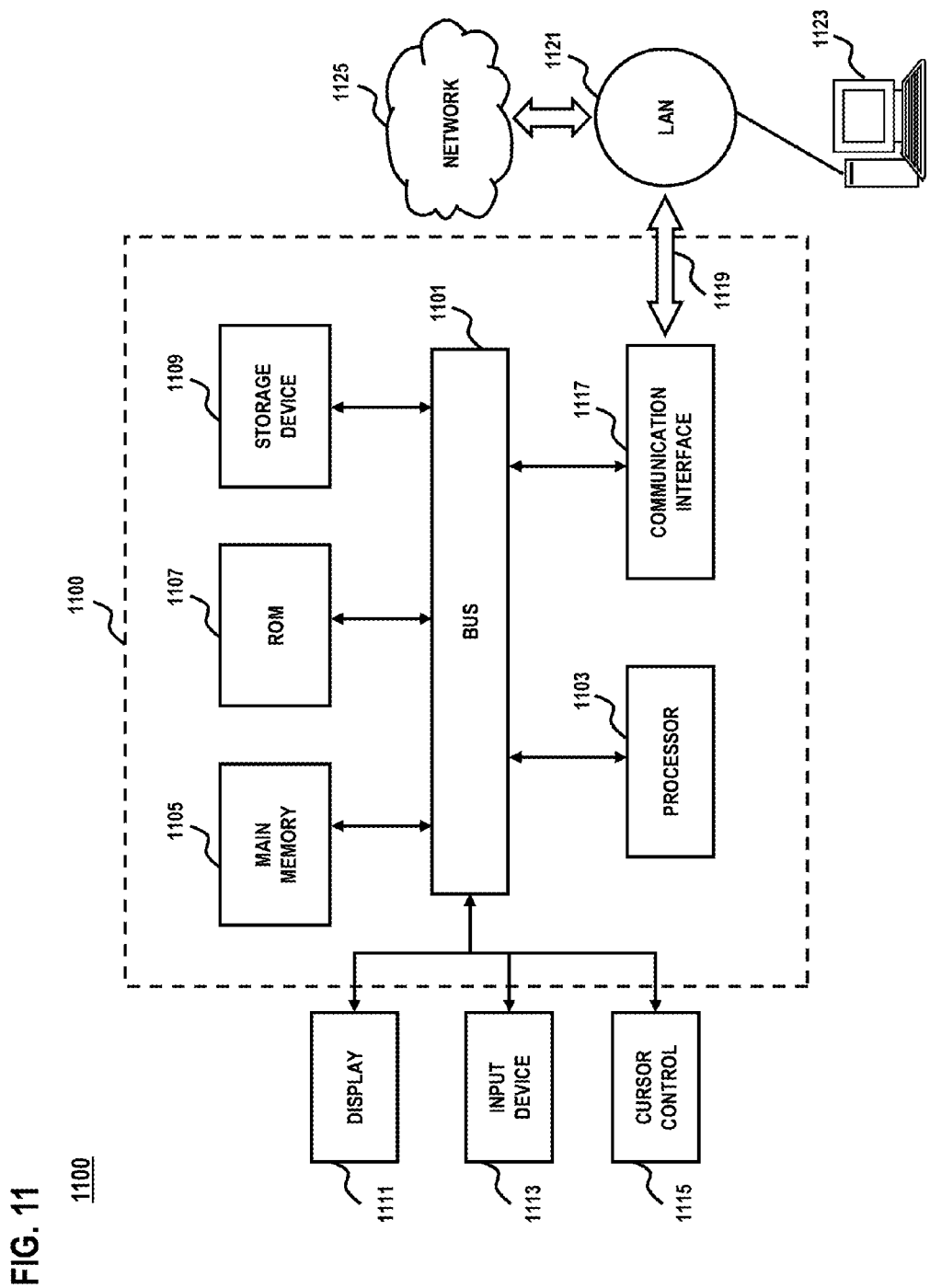
FIG. 11 is a diagram of a computer system that can be used to implement various exemplary embodiments.

FIG. 11 illustrates a computing hardware (e.g., computer system) 1100 on which exemplary embodiments can be implemented. The computer system 1100 includes a bus 1101 or other communication mechanism for communicating information and a processor 1103 coupled to the bus 1101 for processing information. The computer system 1100 also includes main memory 1105, such as a Random Access Memory (RAM) or other dynamic storage device, coupled to the bus 1101 for storing information and instructions to be executed by the processor 1103. Main memory 1105 may also be used for storing temporary variables or other intermediate information during execution of instructions by the processor 1103. The computer system 1100 may further include a Read Only Memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a Cathode Ray Tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an exemplary embodiment, the processes described herein are performed by the computer system 1100, in response to the processor 1103 executing an arrangement of instructions contained in the main memory 1105. Such instructions can be read into the main memory 1105 from another computer-readable medium, such as the storage device 1109. Execution of the arrangement of instructions contained in the main memory 1105 causes the processor 1103 to perform the process steps described herein. One or more processors in a multi-processing arrangement may also be employed to execute the instructions contained in the main memory 1105. In alternative embodiments, hard-wired circuitry may be used in place of or in combination with software instructions to implement exemplary embodiments. Thus, exemplary embodiments are not limited to any specific combination of hardware circuitry and software.

The computer system 1100 also includes a communication interface 1117 coupled to the bus 1101. The communication interface 1117 provides a two-way data communication coupling to a network link 1119 connected to a local network 1121. For example, the communication interface 1117 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 1117 may be a Local Area Network (LAN) card (e.g., for Ethernet™ or an Asynchronous Transfer Mode (ATM) network) to provide a data communication connection to a compatible LAN. Wireless links can also be implemented, in one embodiment. In any such implementation, the communication interface 1117 sends and receives electrical, electromagnetic, or optical signals that carry digital data streams representing various types of information. Further, the communication interface 1117 may include peripheral interface devices, such as a Universal Serial Bus (USB) interface, a Personal Computer Memory Card International Association (PCMCIA) interface, etc. Although a single communication interface 1117 is depicted in FIG. 11, multiple communication interfaces may also be employed.

The network link 1119 typically provides data communication through one or more networks to other data devices. For example, the network link 1119 may provide a connection through the local network 1121 to a host computer 1123, which has connectivity to a network 1125 (e.g., a Wide Area Network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 may send messages and receive data, including program code, through the network(s), the network link 1119, and the communication interface 1117. In the Internet example, a server (not shown) might transmit requested code belonging to an application program for implementing an exemplary embodiment through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as the main memory 1105. Transmission media include coaxial cables, copper wire and fiber optics, including the wires that include the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to main memory, from which a processor retrieves and executes the instructions. The instructions received by the main memory can optionally be stored on storage device either before or after execution by processor.

Figure 12:
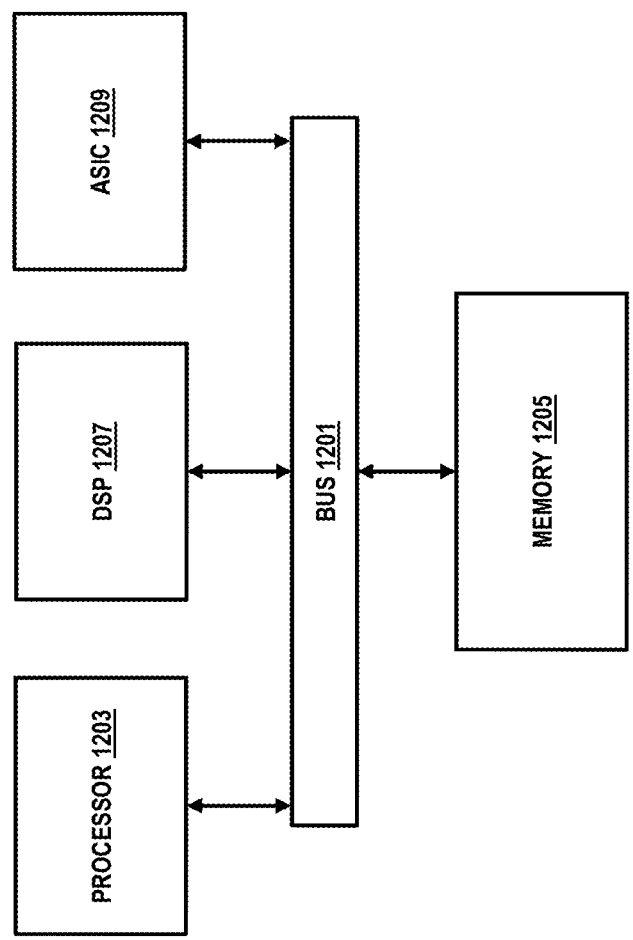
FIG. 12 is a diagram of a chip set upon which an embodiment of the invention may be implemented, according to one embodiment.

FIG. 12 illustrates a chip set 1200 upon which an embodiment of the invention may be implemented. The chip set 1200 is programmed to present a slideshow as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core to perform independently. A multi-core processor enables multiprocessing within a single physical package. Examples of a multi-core processor may include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more Digital Signal Processors (DSP) 1207, or one or more Application-Specific Integrated Circuits (ASIC) 1209. The DSP 1207 typically processes real-world signals (e.g., sound) in real-time independently of the processor 1203. Similarly, the ASIC 1209 may perform specialized functions not easily performed by a general purposed processor. Other specialized components to aid in performing the inventive functions described herein include one or more Field Programmable Gate Arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    accessing, by a processor, an application database to access application data,
        the application data including drag-and-drop application templates;
    initiating, by the processor and based on accessing the application data, presentation of a graphical user interface comprising one or more screens for developing a machine-to-machine application to provide a service involving one or more machines;
    detecting, by the processor, login by a device developer user;
    retrieving, by the processor, one or more first screens, of the graphical user interface, related to a device developer interface;
    providing, by the processor and for display, the device developer interface in response to the detection of the login by the device developer user,
        the device developer interface including,
            a first section presenting a list of the one or more machines associated with the device developer user,
                the one or more machines being selectively available for the machine-to-machine application,
            a second section associated with registration of a new machine, and
            a third section for a marketplace option to permit the device developer user to specify pricing information for the one or more machines;
    detecting, by the processor, login by an application developer user;
    providing, by the processor and for display, one or more second screens, of the graphical user interface, related to an application developer interface based on detecting the login by the application developer user;
    detecting, by the processor, a selection of a drag-and-drop option based on providing, for display, the one or more second screens,
        the drag-and-drop option including utilizing one or more templates, of the drag-and-drop application templates, to develop the machine-to-machine application;
    detecting, by the processor, a selection of the one or more templates; and
    building, by the processor, the machine-to-machine application based on the selection of the one or more templates.

2. The method of claim 1, further comprising:
    determining a machine status of the one or more machines on the list,
        the machine status including a build status specifying at least one of:
            a completion state of the one or more machines,
            a usage statistic relating to a frequency of use of the one or more machines on the list, or
            a maintenance issue; and
    presenting the machine status.

3. The method of claim 1, further comprising:
    determining a machine type based on a primary functionality of the new machine;
    determining a machine identification data including information identifying at least one of:
        a brand associated with the new machine,
        a model associated with the new machine, or
        a version associated with the new machine;
    determining a machine communication information based on at least one of:
        a communication path associated with the new machine, or
        a communication technology type associated with the new machine; and
    registering the new machine based on determining, the machine type, the machine identification data, and the machine communication information.

4. The method of claim 3, further comprising:
    determining one or more machine data measurements based on the primary functionality of the new machine; and
    determining one or more machine actions based on the primary functionality of the new machine; and
    where registering the new machine comprises:
        registering the new machine based on determining the one or more machine data measurements and the one or more machine actions.

5. The method of claim 1,
    where the application developer interface includes:
        a first section presenting a list of one or more applications associated with the application developer user,
        a second section displaying information about the one or more machines that can be used as part of the machine-to-machine application,
        a third section for initiating creation of the machine-to-machine application for the one or more machines that can be used, and
        a fourth section for another marketplace option for the application developer user to specify information pricing information for the machine-to-machine application.

6. The method of claim 1, further comprising:
    creating a machine-to-machine application framework based on at least one of:
        one or more particular machines selected by the application developer user,
        a communication path associated with the one or more particular machines, or
        a communication technology type associated with a primary functionality of the one or more particular machines.

7. The method of claim 6, further comprising:
    determining one or more user interface options based on at least one of:
        the primary functionality of the one or more particular machines, or
        one or more machine data measurements; and
    presenting the one or more user interface options for input by the application developer user.

8. The method of claim 1, further comprising:
determining a machine emulator based on the machine-to-machine application; and
testing and debugging the machine-to-machine application using the machine emulator.

9. The method of claim 1, further comprising:
detecting a login by an application user;
retrieving one or more screens related to an application user interface; and
presenting the application user interface in response to the detection of the login by the application user,
the application user interface including:
a first section presenting a list of the one or more machines, gateways, or machine-to-machine applications associated with the application user,
a second section associated with registration of at least one of a new machine or gateway, associating at least one of the new machine or gateway with the application user, and
a third section for a marketplace option to permit the application user to purchase at least one of the one or more machines, the gateways, or the machine-to-machine applications.

10. The method of claim 9, further comprising:
prompting the application user to select one of the machine-to-machine applications;
determining one or more machine options, based on the selected machine-to-machine application, for at least one of:
tracking machine data,
viewing the tracked machine data,
viewing real-time machine data, or
controlling machine action; and
presenting the one or more machine options.

11. The method of claim 9, where the machine-to-machine application is a first machine-to-machine application; and
where the method further comprises:
determining that a second machine-to-machine application exists for at least one of the new machine or gateway; and
creating the second machine-to-machine application based on determining that the second machine-to-machine application exists.

12. An apparatus comprising:
at least one processor to:
access an application database to access application data,
the application data including data including drag-and-drop application templates;
initiate, based on accessing the application data, presentation of a graphical user interface comprising one or more screens for developing a machine-to-machine application to provide a service involving one or more machines;
detect login by a device developer user;
retrieve one or more first screens, of the graphical user interface, related to a device developer interface;
provide, for display, the device developer interface based on detecting the login by the device developer user,
the device developer interface including,
a first section presenting a list of the one or more machines associated with the device developer user,
the one or more machines being selectively available for the machine-to-machine application,
a second section associated with registration of a new machine, and
a third section for a marketplace option to permit the device developer user to specify pricing information for the one or more machines;
detect login by an application developer user;
provide, for display, one or more second screens, of the graphical user interface, related to an application developer interface based on detecting the login by the application developer user;
detect a selection of a drag-and-drop option based on providing, for display, the one or more second screens,
the drag-and-drop option including utilizing one or more templates, of the drag-and-drop application templates, to develop the machine-to-machine application;
detect a selection of the one or more templates; and
build the machine-to-machine application based on the selection of the one or more templates.

13. The apparatus of claim 12, wherein the at least one processor is further to:
determine a machine status of the one or more machines on the list,
the machine status including a build status specifying at least one of:
a completion state of the one or more machines,
a usage statistic relating to a frequency of use of the one or more machines on the list, or
a maintenance issue; and
present the machine status.

14. The apparatus of claim 12, wherein the at least one processor is further to:
determine a machine type based on a primary functionality of the new machine,
determine a machine identification data including information identifying at least one of:
a brand associated with the new machine,
a model associated with the new machine, or
a version associated with the new machine;
determine a machine communication information based on at least one of:
a communication path associated with the new machine, or
a communication technology type associated with the new machine; and
register the new machine based on determining the machine type, the machine identification data, and the machine communication information.

15. The apparatus of claim 14, wherein the at least one processor is further to:
determine one or more machine data measurements based on the primary functionality of the new machine; and
determine one or more machine actions based on the primary functionality of the new machine; and
where the at least one processor, when registering the new machine, is to:
register the new machine based on determining the one or more machine data measurements and the one or more machine actions.

16. The apparatus of claim 12,
where the application developer interface includes:
a first section presenting a list of one or more applications associated with the application developer user, a second section displaying information about the one or more machines that can be used as part of the machine-to-machine application,
a third section for initiating creation of the machine-to-machine application for the one or more machines that can be used, and
a fourth section for another marketplace option for the application developer user to specify information pricing information for the machine-to-machine application.

17. The apparatus of claim 12, wherein the at least one processor is further to:
create a machine-to-machine application framework based on at least one of:
one or more particular machines selected by the application developer user,
a communication path associated with the one or more particular machines, or
a communication technology type associated with a primary functionality of the one or more particular machines.

18. The apparatus of claim 17, wherein the at least one processor is further to:
determine one or more user interface options based on at least one of:
the primary functionality of the one or more particular machines, or
one or more machine data measurements; and
present the one or more user interface options for input by the application developer user.

19. The apparatus of claim 16, wherein the apparatus is further caused to:
determine a machine emulator based on the machine-to-machine application; and
test and debug the machine-to-machine application using the machine emulator.

20. The apparatus of claim 12, wherein the apparatus is further caused to:
detect a login by an user;
retrieve one or more screens related to an application user interface; and
present the application user interface based on detecting the login by the application user,
the application user interface including:
a first section presenting a list of the one or more machines, gateways, or machine-to-machine applications associated with the application user,
a second section, associated with registration of at least one of a new machine or gateway, associating at least one of the new machine or gateway with the application user, and
a third section for a marketplace option to permit the application user to purchase the one or more machines, the gateways, or the machine-to-machine applications.

21. The apparatus of claim 20, wherein the at least one processor is further to:
prompt the application user to select one of the machine-to-machine applications;
determine one or more machine options based on the selected machine-to-machine application for at least one of:
tracking machine data,
viewing the tracked machine data,
viewing real-time machine data, or
controlling machine action; and
present the one or more machine options.

22. The apparatus of claim 20, where the machine-to-machine application is a first machine-to-machine application; and
wherein the at least one processor is further to:
determine that a second machine-to-machine application exists for at least one of the new machine or gateway; and
create the second machine-to-machine application based on at least one of:
determining that the second machine-to-machine application exists.

23. A non-transitory computer-readable medium storing instructions, the instructions comprising:
one or more instructions that, when executed by one or more processors, cause the one or more processors to:
access an application database to access application data,
the application data including drag-and-drop application templates;
initiate, based on accessing the application data, presentation of a graphical user interface comprising one or more screens for developing a machine-to-machine application to provide a service involving one or more machines;
detect login by a device developer user;
retrieve one or more screens related to a device developer interface; and
present the device developer interface based on detecting the login by the device developer user,
the device developer interface including:
a first section presenting a list of the one or more machines associated with the device developer user,
the one or more machines being selectively available for the machine-to-machine application,
a second section associated with registration of a new machine, and
a third section for a marketplace option to permit the device developer user to specify pricing information;
detect login by an application developer user;
provide, for display, one or more second screens, of the graphical user interface, related to an application developer interface based on detecting the login by the application developer user;
detect a selection of a drag-and-drop option based on providing, for display, the one or more second screens,
the drag-and-drop option including utilizing one or more templates, of the drag-and-drop application templates, to develop the machine-to-machine application;
detect a selection of the one or more templates; and
build the machine-to-machine application based on detecting the selection of the one or more templates.

24. The non-transitory computer-readable medium of claim 23,
where the application developer interface includes:
a first section presenting a list of one or more applications associated with the application developer user,
a second section displaying information about the one or more machines that can be used as part of the machine-to-machine application,
a third section for initiating creation of the machine-to-machine application for the one or more machines that can be used, and a fourth section for another marketplace option for the application developer user to specify information pricing information for the machine-to-machine application.

\* \* \* \* \*